United States Patent
Budz et al.

(10) Patent No.: US 12,552,345 B2
(45) Date of Patent: Feb. 17, 2026

(54) REMOTE VEHICLE SYSTEM ACTUATION

(71) Applicant: International Engine Intellectual Property Company, LLC, Lisle, IL (US)

(72) Inventors: Bartlomiej Budz, Aurora, IL (US); Srinivas Mallela, Aurora, IL (US); David Hillman, Lake Forest, IL (US); Yaseen Suleman, Glendale Heights, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 113 days.

(21) Appl. No.: 18/125,251

(22) Filed: Mar. 23, 2023

(65) Prior Publication Data

US 2024/0317175 A1    Sep. 26, 2024

(51) Int. Cl.
*B60R 25/24*    (2013.01)
*B60R 25/32*    (2013.01)
(Continued)

(52) U.S. Cl.
CPC .............. *B60R 25/24* (2013.01); *B60R 25/32* (2013.01); *G07C 9/00309* (2013.01); *G07C 9/27* (2020.01); *G07C 2009/00507* (2013.01)

(58) Field of Classification Search
CPC ........ G07C 9/27; G07C 9/00309; B60R 25/32
See application file for complete search history.

(56) References Cited

U.S. PATENT DOCUMENTS

| 6,430,486 B1 | 8/2002 | Diaz et al. |
| 7,278,023 B1 | 10/2007 | Siegel |

(Continued)

FOREIGN PATENT DOCUMENTS

| DE | 102012200725 A1 | 7/2013 |
| DE | 102013214018 A1 | 1/2015 |

(Continued)

OTHER PUBLICATIONS

Office Action for DE102024104107.2, dated Jul. 9, 2025 (11 pages).

*Primary Examiner* — Quan Zhen Wang
*Assistant Examiner* — Mancil Littlejohn, Jr.
(74) *Attorney, Agent, or Firm* — Jack D. Nimz; Umang Khanna

(57) ABSTRACT

Aspects of the disclosure relate to methods, systems, and non-transitory computer readable media for the actuation of vehicle systems. A vehicle actuation command that includes an indication of a requesting entity and vehicle systems a requesting entity is authorized to actuate may be received. There may be a determination of whether a vehicle actuation command is valid and based on a vehicle actuation command being valid there may be a determination of whether a requesting entity is authorized to actuate a vehicle's systems. Based on a requesting entity being authorized to actuate a vehicle's systems, there may be a determination of whether a vehicle is in a safe operational state that will allow a vehicle actuation command to be safely implemented by a vehicle's systems. Furthermore, based on a vehicle being in a safe operational state, a vehicle systems indicated in a vehicle actuation command may be actuated.

19 Claims, 10 Drawing Sheets

(51) Int. Cl.
*G07C 9/00* (2020.01)
*G07C 9/27* (2020.01)

(56) References Cited

U.S. PATENT DOCUMENTS

| | | | |
|---|---|---|---|
| 8,350,688 B2 | 1/2013 | Wang et al. | |
| 9,365,188 B1 | 6/2016 | Penilla | |
| 9,710,983 B2 * | 7/2017 | Asmar | G07C 9/00309 |
| 2004/0181327 A1 * | 9/2004 | Tsosie | B60R 25/255 |
| | | | 340/5.8 |
| 2005/0134115 A1 | 6/2005 | Betts, Jr. | |
| 2005/0242971 A1 * | 11/2005 | Dryer | B60R 25/102 |
| | | | 340/539.19 |
| 2006/0129691 A1 | 6/2006 | Coffee | |
| 2007/0164166 A1 * | 7/2007 | Hirvonen | B64C 13/504 |
| | | | 244/175 |
| 2007/0299573 A1 | 12/2007 | Carlstrom | |
| 2008/0077299 A1 | 3/2008 | Arshad | |
| 2008/0319599 A1 | 12/2008 | Ptak et al. | |
| 2009/0027177 A1 | 1/2009 | Hodder | |
| 2009/0093925 A1 | 4/2009 | Gumbel | |
| 2010/0145565 A1 | 6/2010 | Rodriguez et al. | |
| 2010/0185356 A1 | 7/2010 | Haas et al. | |
| 2010/0228404 A1 | 9/2010 | Link, II | |
| 2011/0153142 A1 | 6/2011 | Delaney et al. | |
| 2012/0162423 A1 | 6/2012 | Xiao | |
| 2015/0203125 A1 | 7/2015 | Penilla | |
| 2015/0264017 A1 * | 9/2015 | Saed | H04L 63/045 |
| | | | 380/270 |
| 2015/0271201 A1 | 9/2015 | Ruvio | |
| 2017/0067385 A1 | 3/2017 | Hunt | |
| 2017/0270490 A1 | 9/2017 | Penilla | |
| 2018/0222281 A1 * | 8/2018 | Tamane | G07C 5/008 |
| 2019/0092280 A1 * | 3/2019 | Oesterling | G06F 21/86 |
| 2019/0236510 A1 | 8/2019 | Kwak | |
| 2020/0055518 A1 | 2/2020 | Johnson | |

FOREIGN PATENT DOCUMENTS

| | | | | |
|---|---|---|---|---|
| DE | 102013020333 A1 | 6/2015 | | |
| DE | 102015015468 A1 | 5/2016 | | |
| DE | 102018108131 A1 | 10/2018 | | |
| WO | WO-2017100893 A1 * | 6/2017 | | B60T 17/18 |

* cited by examiner

REMOTE VEHICLE SYSTEM ACTUATION

FIELD OF THE INVENTION

The field of the disclosure relates to remote actuation of vehicle systems. More specifically, the disclosure relates to improvements in generating and transmitting signals to authorize the actuation of vehicle systems, monitoring requests to actuate vehicle systems, and regulating the processes by which vehicle systems are actuated.

BACKGROUND

There are situations in which remotely accessing a vehicle may be convenient. For example, in a situation in which vehicles are rented out to customers it may be convenient to remotely enable access to a vehicle at the time that a customer is granted access. Further, when a customer's rental period expires access to a vehicle may be disabled. In other situations, an organization may wish to access or control its vehicles remotely, particularly under circumstances in which it would be cumbersome to require an employee to manually access or control a vehicle. For example, a group of vehicles in a parking lot may be collectively locked based on the use of remote signals. However, there may be room for improvement in the field of remote vehicle access. In particular, there may be ways in which the safety and security of remote access may be improved.

SUMMARY

In light of the foregoing background, the following presents a simplified summary of the present disclosure in order to provide a basic understanding of various aspects of the disclosure. The summary is not limiting with respect to the exemplary aspects of the disclosure described herein and is not an extensive overview of the disclosure. It is not intended to identify key or critical elements of or steps in the disclosure or to delineate the scope of the disclosure. Instead, as may be understood by a person of ordinary skill in the art, the following summary merely presents some concepts of the disclosure in simplified form as a prelude to the more detailed description provided below. Moreover, sufficient written descriptions of the embodiments of this application are disclosed in the specification throughout this application along with exemplary, non-exhaustive, and non-limiting manners and processes of making and using the inventions, in such full, clear, and concise, and exact terms in order to enable skilled artisans to make and use the inventions without undue experimentation and sets forth the best mode contemplated by the inventor for carrying out the inventions.

Aspects of this disclosure address ways of improving the security, safety and overall effectiveness with which vehicle systems may be remotely actuated. In some embodiments, a vehicle actuation command may be received by a computing system comprising one or more processors. The vehicle actuation command may comprise a request to actuate one or more systems of a vehicle, an indication of a requesting entity, and the one or more systems of a vehicle that a requesting entity is authorized to actuate. There may be a determination of whether a vehicle actuation command is valid or invalid. Based on a vehicle actuation command being valid, there may be a determination of whether a requesting entity is authorized to actuate the one or more systems of a vehicle. Based on a requesting entity being authorized to actuate the one or more systems of a vehicle, there may be a determination of whether a vehicle is in a safe operational state that will allow a vehicle actuation command to be safely implemented by the one or more systems of a vehicle. Furthermore, based on a vehicle being in a safe operational state, the one or more systems of a vehicle indicated in a vehicle actuation command may be actuated.

In some aspects of this disclosure determining whether a vehicle actuation command is valid may comprise performing one or more error detection operations to determine whether a vehicle actuation command is valid, wherein the one or more error detection operations comprise a cyclic redundancy check (CRC), a checksum, and/or a parity check.

In some aspects of this disclosure determining whether a vehicle actuation command is valid may comprise comparing the indication of a requesting entity to authorized entity data comprising one or more indications of authorized entities that are authorized to actuate the one or more systems of a vehicle indicated in a vehicle actuation command. Further, determining whether a vehicle actuation command is valid may comprise, based on the indication of a requesting entity matching at least one of the one or more indications of authorized entities, determining that a vehicle actuation command is valid.

In some aspects of this disclosure, based on a vehicle actuation command not being valid, a notification indicating that a vehicle actuation command is not valid may be sent to an entity with authorization to access or control a vehicle.

In some aspects of this disclosure, based on a vehicle not being in a safe operational state, a notification may be sent to a requesting entity. The notification may indicate that a vehicle is not in a safe operational state that will allow a vehicle actuation command to be safely implemented by the one or more systems of a vehicle.

In some aspects of this disclosure, a vehicle actuation command may be received by a telematic control unit (TCU) of a vehicle. Further, the determination of whether a requesting entity is authorized to actuate the one or more systems of a vehicle may comprise wirelessly sending a vehicle actuation command from the TCU of a vehicle to a body control module (BCM) of a vehicle. The BCM and/or the TCU may be configured to determine whether a requesting entity is authorized to actuate the one or more systems of a vehicle.

In some aspects of this disclosure, a vehicle actuation command may comprise an indication of an authorized geographic area within which a vehicle actuation command is authorized to actuate the one or more systems of a vehicle. Further, determining whether a vehicle is in a safe operational state that will allow a vehicle actuation command to be safely implemented by the one or more systems of a vehicle may comprise determining a location of a vehicle. In some aspects of this disclosure, the location of a vehicle is based on information from a navigation system of a vehicle. Further, determining whether a vehicle is in a safe operational state may comprise determining whether a vehicle is within the authorized geographic area within which a vehicle actuation command is authorized to actuate the one or more systems of a vehicle, and based on a vehicle being within the authorized geographic area, determining that a vehicle is in a safe operational state that will allow a vehicle actuation command to be safely implemented by the one or more systems of a vehicle.

In some aspects of this disclosure, determining whether a vehicle is in a safe operational state may comprise determining whether one or more brakes of a vehicle are in a locked state, and based on a predetermined portion of the brakes of a vehicle being in a locked state, determining that a vehicle is in a safe operational state that will allow a vehicle actuation command to be safely implemented by the one or more systems of a vehicle.

In some aspects of this disclosure, determining whether a vehicle is in a safe operational state may comprise determining a velocity of a vehicle, and based on the velocity of the vehicle indicating that a vehicle is stationary, determining that a vehicle is in a safe operational state that will allow a vehicle actuation command to be safely implemented by the one or more systems of a vehicle.

In some aspects of this disclosure, determining whether a vehicle is in a safe operational state may be performed by a BCM of a vehicle.

In some aspects of this disclosure actuating the one or more systems of a vehicle that are indicated in a vehicle actuation command may be based on one or more signals sent to one or more electronic control units (ECUs) associated with the one or more systems of a vehicle.

In some aspects of this disclosure a vehicle actuation command may comprise instructions to start up a vehicle or instructions to shut down a vehicle. Further, actuating the one or more systems of a vehicle indicated in a vehicle actuation command may comprise, based on a vehicle actuation command comprising instructions to start up a vehicle, starting up a vehicle, or based on a vehicle actuation command comprising instructions to shut down a vehicle, shutting a vehicle down.

In some aspects of this disclosure a vehicle actuation command comprises instructions to lock one or more doors of a vehicle or instructions to unlock one or more doors of a vehicle. Further, actuating the one or more systems of a vehicle indicated in a vehicle actuation command may comprise, locking one or more doors of a vehicle based on a vehicle actuation command comprising instructions to lock one or more doors of a vehicle, or unlocking one or more doors of a vehicle based on a vehicle actuation command comprising instructions to unlock one or more doors of a vehicle.

The vehicle actuation command may comprise an indication of a cabin temperature, an indication to activate a cabin control system of the vehicle, an indication to deactivate the cabin control system, an indication for the cabin control system to heat a cabin of the vehicle, or an indication for the cabin control system to cool the cabin of the vehicle. Further, actuating the one or more systems of a vehicle that are indicated in a vehicle actuation command may comprise accessing a cabin control system of a vehicle cabin of a vehicle, and setting a temperature of a vehicle cabin based on the cabin temperature indicated in a vehicle actuation command, activating a cabin control system of the vehicle based on the vehicle actuation command, deactivating the cabin control system based on the vehicle actuation command, heating a cabin of the vehicle based on the vehicle actuation command, or cooling the cabin of the vehicle based on the vehicle actuation command.

In some aspects of this disclosure, based on a requesting entity not being authorized to actuate the one or more systems of a vehicle, a notification may be sent to an entity with authorization to access or control a vehicle. The notification may indicate that a vehicle actuation command from an entity that is not authorized to actuate one or more systems of a vehicle was received.

In some aspects of this disclosure a vehicle actuation command may be received wirelessly. Further, a vehicle actuation command may be received from a remote computing device associated with a requesting entity.

In some aspects of this disclosure a vehicle actuation command may comprise a short message service (SMS) message.

In some embodiments, a vehicle actuation command comprising a request to actuate one or more systems of a vehicle may be received. The vehicle actuation command may comprise an indication of a requesting entity, an indication of the one or more systems of a vehicle that a requesting entity is authorized to actuate, a time stamp, and/or a location of a requesting entity. There may be a determination of whether a vehicle actuation command meets one or more criteria. Activity log data comprising one or more indications of whether a vehicle actuation command meets the one or more criteria may be generated. Based on a vehicle actuation command meeting the one or more criteria, a vehicle actuation command may be sent to a vehicle. In some aspects of this disclosure a vehicle actuation command may be sent to a telematic control unit of a vehicle.

In some aspects of this disclosure a vehicle or a system associated with the vehicle may be configured to send one or more error codes when a vehicle actuation command is received, and the one or more systems of a vehicle are not successfully actuated. Further, based on receiving the one or more error codes, activity log data may be generated. Activity log data may comprise an indication of the one or more systems of a vehicle that were not successfully actuated.

In some aspects of this disclosure the one or more error codes may comprise an error code indicating that a vehicle actuation command was not valid or an error code indicating that a vehicle was not in a safe operational state at the time a vehicle actuation command was received.

In some aspects of this disclosure the telematic control unit may be configured to send a confirmation signal comprising an indication that the one or more systems of a vehicle were successfully actuated. Further, based on receiving the confirmation signal, activity log data comprising the indication that the one or more systems of a vehicle were successfully actuated may be generated.

In some aspects of this disclosure, based on a vehicle actuation command not meeting the one or more criteria, a notification may be sent to an entity that is authorized to grant authorization to actuate the one or more systems of a vehicle. The notification may comprise an indication of suspicious activity.

In some aspects of this disclosure, based on a vehicle actuation command not meeting the one or more criteria, a vehicle actuation command comprising one or more instructions to deauthorize remote actuation of the one or more systems of a vehicle may be sent to a vehicle. The one or more criteria may comprise one or more doors of the vehicle not being unlocked and/or one or more doors of the vehicle not being in an open state. Further, the one or more instructions may comprise an instruction to disable remote actuation of the one or more systems of a vehicle until an instruction to reauthorize remote authorization of the one or more systems of a vehicle has been received, an instruction to disable remote actuation of the one or more systems of the vehicle until a predetermined amount of time has elapsed, an instruction to disable actuation of the one or more systems of the vehicle for a predetermined time period, and/or an instruction to limit a number of times that one or more doors of the vehicle may be unlocked within a predetermined time period.

In some aspects of this disclosure the one or more instructions may comprise an instruction to disable remote actuation of the one or more systems of a vehicle until one or more remote actuation criteria have been met. Further, meeting the one or more remote actuation criteria may comprise receiving an instruction to reauthorize remote authorization of the one or more systems of a vehicle or a predetermined amount of time elapsing.

In some aspects of this disclosure generating activity log data may comprise generating one or more real-time indications associated with vehicle actuation commands received within a time window. Further, the one or more real-time indications may comprise a total number of vehicle actuation commands received within the time window, one or more time stamps indicating when vehicle actuation commands received within the time window were sent, a location of a vehicle when a vehicle actuation command was received, or one or more locations from which each of the vehicle actuation commands was sent.

In some aspects of this disclosure a vehicle actuation command meeting the one or more criteria may comprise a number of vehicle actuation commands received within a predetermined time interval not exceeding a threshold number of vehicle actuation commands.

In some aspects of this disclosure the threshold number of vehicle actuation commands received within the predetermined time interval may be based on the time stamp associated with a vehicle actuation command.

In some aspects of this disclosure a vehicle actuation command may comprise one or more one or more scheduled actuation times at which to actuate the one or more systems of a vehicle. Further, generating activity log data may comprise adding, to activity log data, one or more indications of one or more times at which the one or more systems of a vehicle were actuated.

In some aspects of this disclosure a vehicle actuation command may comprise one or more one or more scheduled actuation times at which to deactivate the one or more systems of a vehicle. Further, generating activity log data may comprise adding, to activity log data, one or more indications of one or more times at which the one or more systems of a vehicle were deactivated.

In some aspects of this disclosure a vehicle actuation command meeting the one or more criteria may comprise the location of a requesting entity matching at least one authorized entity location.

In some aspects of this disclosure the at least one authorized entity location may be based on authorization from an entity that is authorized to grant authorization to actuate the one or more systems of a vehicle.

In some aspects of this disclosure a vehicle actuation command may comprise a request to lock one or more doors of a vehicle, a request to unlock one or more doors of a vehicle, a request to start up a vehicle, or a request to shut down a vehicle.

In some aspects of this disclosure a report may be generated based on the activity log data. The report may comprise one or more indications of a number of vehicle actuation commands that were successfully completed within a time window or a number of vehicle actuation commands that were not successfully completed within the time window.

Corresponding apparatus, systems, devices, methods, and/or one or more non-transitory computer-readable media are also within the scope of the disclosure. These features, along with many others, are discussed in greater detail below.

BRIEF DESCRIPTION OF THE DRAWINGS

The present disclosure is shown by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Aspects of this disclosure address various ways of improving the effectiveness of operating a vehicle by performing operations including remotely actuating systems associated with a vehicle, determining the validity of vehicle actuation request to actuate systems of vehicles, and/or generating activity log data to monitor activity associated with vehicles. In particular, embodiments described in this disclosure include embodiments that improve the security, safety and overall effectiveness with which vehicle systems may be remotely actuated. For example, the disclosed technology validates incoming vehicle actuation commands to ensure that vehicle actuation commands are from an entity that is authorized to actuate systems of a vehicle. Further, the disclosed technology ensures that a system of a vehicle is safely actuated (e.g., a vehicle is stationary when a door is unlocked). Suspicious and/or inefficient activity may also be detected through generation and use of activity log data that is based on monitoring and tracking various activities relating to the actuation of vehicle systems.

As used herein, actuation may comprise causing a system, device, and/or component to operate and/or perform some action. For example, actuation may comprise a computing system causing another system (e.g., a system of a vehicle) to execute a set of instructions (e.g., instructions indicated in a vehicle actuation command sent by the computing system). Further, actuation may comprise any operation and/or instruction associated with causing a system, device, or component to operate and/or perform some action. For example, actuation may include causing a BCM of a vehicle to lock and/or unlock one or more doors of a vehicle, open and/or close one or more windows of a vehicle, and/or set the temperature within a cabin of a vehicle. By way of further example, actuation may include causing an ECU of a vehicle to start an engine and/or motor of a vehicle and/or shut down an engine and/or motor of a vehicle.

Figure 1:
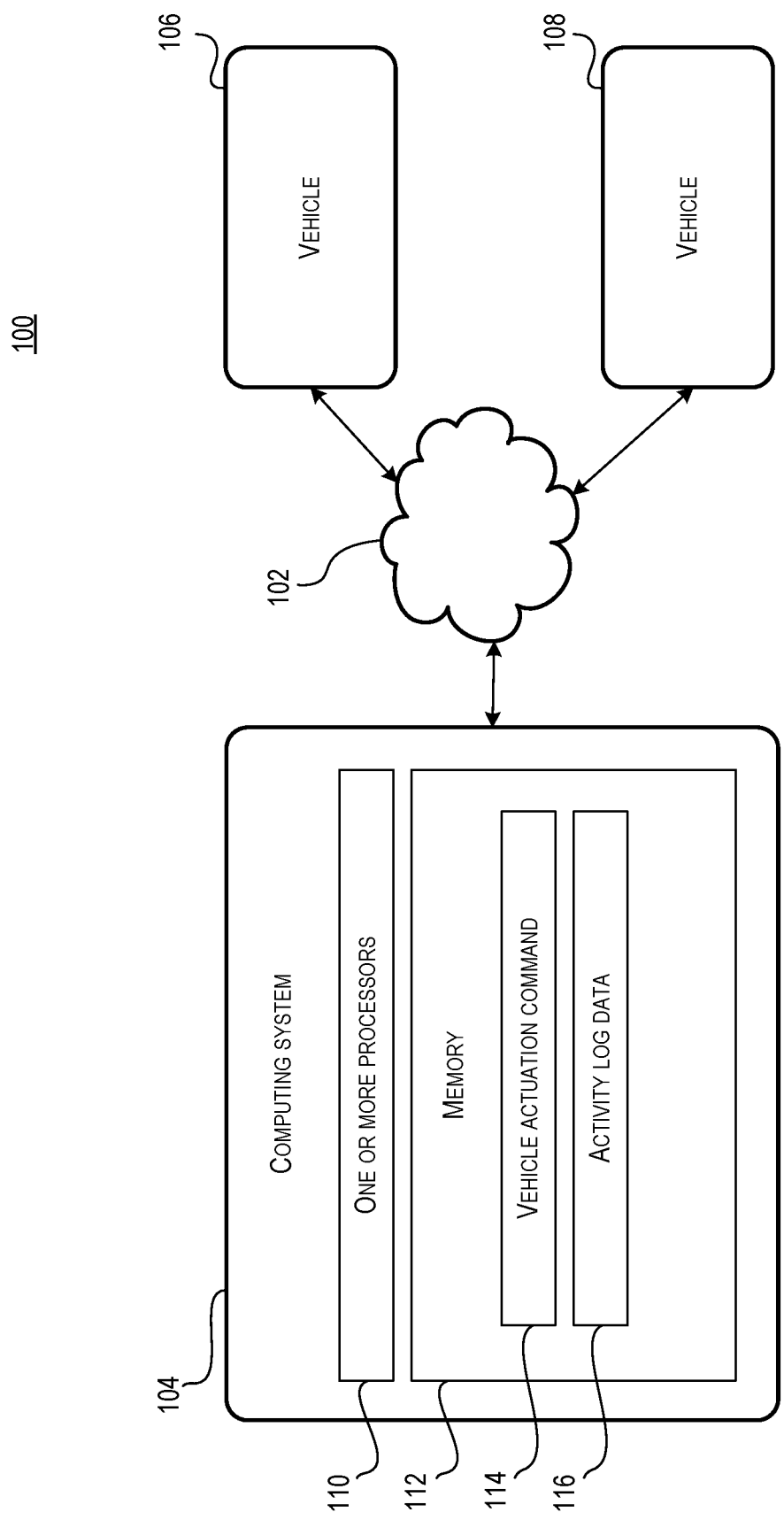
FIG. 1 shows an example of a system in accordance with aspects of the present disclosure.

FIG. 1 shows an example of a system in accordance with aspects of the present disclosure. In particular, FIG. 1 depicts a diagram of a computing system that is configured to perform operations comprising the exchange and processing of signals and/or data that may be used to actuate various systems of a vehicle. As shown in FIG. 1, the computing system includes the network 102, the computing system 104, a vehicle 106, and a vehicle 108. The computing system 104 may comprise one or more processors 110, memory 112, a vehicle actuation command 114, and/or activity log data 116. The system 100 may operate in a standalone environment and/or as part of a networked environment that may include other devices and/or systems. For example, the system 100 may operate in conjunction with other computing systems and/or other computing devices not shown in FIG. 1. As shown in FIG. 1, various computing devices including the computing system 104, a vehicle 106 and/or a vehicle 108 may be interconnected via the network 102. Further, the system 100 may operate via one or more networks not including the network 102 shown in FIG. 1.

The network 102 may be used to communicate (e.g., send and/or receive) signals, information, and/or data. For example, the network 102 may be used to communicate vehicle actuation commands that are sent from the computing system 104 to a vehicle 106 and/or a vehicle 108. The network 102 may include any combination of wired and/or wireless networks and may carry any type of signal or communication including communications and/or signals using one or more communication protocols (e.g., TCP/IP, HTTP, and/or HTTPS). Further, the network 102 may include any combination of a local area network (LAN), an intranet, a wide area network (WAN), and/or the Internet. Furthermore, the network 102 may be configured or arranged according to any known topology and/or architecture.

The computing system 104 may, in some embodiments, implement one or more aspects of the present disclosure by accessing and/or executing instructions; and/or performing one or more operations based at least in part on the instructions. For example, the computing system 104 may generate one or more vehicle actuation commands that may be used to actuate various systems of a vehicle (e.g., lock or unlock doors of a vehicle). In some embodiments, the system 100 may be incorporated into and/or include a computing device (e.g., a computing device with one or more processors, one or more memory devices, one or more input devices, and/or one or more output devices). For example, the computing system 104 may be incorporated into and/or include a desktop computer, a computer server, a computer client, a mobile device (e.g., a laptop computer, a tablet computer, a smart phone, and/or a smart watch), and/or any other type of processing device. Further, the computing system 104 may be accessed by one or more client devices (not shown). For example, a client device (e.g., a smartphone) may be used to access a web portal that is used to generate vehicle actuation commands that may be sent from the computing system 104.

The computing system 104 may include one or more interconnects for communication between different components of the computing device. The computing system 104 may also include a network interface via which the computing system 104 may exchange one or more signals including information and/or data with other computing systems and/or computing devices. For example, the computing system 104 may send information and/or data (e.g., a vehicle actuation command) to a vehicle 106 and/or vehicle 108 via the network 102. By way of further example, the computing system 104 may receive information and/or data (e.g., activity log data associated with an entity that is authorized to access and/or control a vehicle) from a vehicle 106 and/or vehicle 108 via the network 102. Further, the computing system 104 may include one or more input devices (e.g., a keyboard, mouse, touch screen, stylus, and/or microphone) and/or one or more output devices (e.g., a display device and/or audio output devices including loudspeakers).

The computing system 104 may include one or more computing devices. Further, as seen in FIG. 1, the computing system 104 may include one or more processors 110 and a memory 112. The one or more processors 110 may include any combination of processing devices (e.g., one or more computer processing units (CPUs), one or more graphics processing units (GPUs), one or more processor cores, one or more microprocessors, one or more application specific integrated circuits (ASICs), one or more field programmable gate arrays (FPGAs), and/or one or more controllers). By way of example, the computing system 104 may comprise the one or more processors 110 and memory 112 that may store instructions that, when executed by the one or more processors 110, causes the computing system 104 to perform operations which may include the operations described herein. The one or more processors 110 may execute instructions including instructions stored in the memory 112. Further, the one or more processors 110 may be arranged in various configurations including any combination of one or more serial processors and/or one or more parallel processors.

The memory 112 may include one or more computer-readable media (e.g., non-transitory computer-readable media) and may be configured to store data and/or instructions including the vehicle actuation command 114 and/or the activity log data 116. Further, the memory 112 may include one or more memory devices including random access memory (RAM), read only memory (ROM), programmable read only memory (PROM), erasable programmable read only memory (EPROM), electrically erasable programmable read only memory (EEPROM), solid state drives (SSDs), hard disk drives (HDDs), and/or hybrid memory devices that use a combination of different types of memory technologies. As shown in FIG. 1, the memory may be used to store a vehicle actuation command 114 and/or activity log data 116. The vehicle actuation command 114 may include instructions that may be used by a vehicle 106 and/or vehicle 108 to actuate one or more vehicle systems (e.g., door system and/or lock system) indicated in the vehicle actuation command.

The vehicle actuation command 114 may include one or more portions of data stored in the memory 112. Furthermore, a vehicle actuation command 114 may include information that indicates a system of a vehicle that may be actuated (e.g., a door), the way in which the system of a vehicle may be actuated (e.g., unlocking a door), and a system of a vehicle that may actuate the system (e.g., a BCM that may actuate a door mechanism that unlocks a door).

The activity log data 116 may include information associated with the activity of one or more systems of a vehicle. For example, the activity log data 116 may include information associated with a vehicle system indicated in a vehicle actuation command and/or a time stamp indicating when a vehicle actuation command was sent and/or received. Further, the activity log data 116 may comprise information received from a BCM (e.g., BCM 208 shown in FIG. 2), ECU (e.g., ECU 210 shown in FIG. 2), and/or a telematic module (e.g., the TCU 212 shown in FIG. 2). For example, the activity log data may 116 comprise an indication of a time when a vehicle actuation command to unlock a door of a vehicle was received by a BCM and whether the door was successfully unlocked.

The vehicle 106 and vehicle 108 may include an automobile (e.g., a sedan, sports utility vehicle, station wagon, minivan, and/or pick-up truck), a truck (e.g., a semi-trailer truck, tank truck, and/or box truck), and/or a bus. In some embodiments, a vehicle may include a railroad train, a boat, and/or an aircraft (e.g., aircraft or helicopter). Further, a vehicle 106 and/or a vehicle 108 may include a device that is associated with a vehicle. For example, a vehicle 106 may include a trailer (e.g. a cargo trailer) that may be attached to a vehicle 106 and used to carry cargo. The vehicle 106 and/or a vehicle 108 may include any of the features and/or components of the computing system 104. For example, a vehicle 106 and/or a vehicle 108 may include one or more processors, a memory, one or more input devices, and/or one or more output devices. Further, a vehicle 106 and/or a vehicle 108 may have different or similar configurations and/or architectures to that of the computing system 104. Further, a vehicle 106 and/or vehicle 108 may include various components including windows, brakes, doors, and/or specific types of computing systems (e.g., one or more BCMs, one or more ECUs, and/or one or more TCUs). An example of a vehicle is further described in a vehicle 200 show in FIG. 2. Further, a vehicle 106 and/or a vehicle 108 may include any of the systems and/or components of a vehicle 200 shown in FIG. 2.

One or more aspects described herein may be embodied in computer-usable, computer-readable data, and/or computer-executable instructions, which may be stored as data and/or instructions in one or more memory devices and/or executed by one or more computing devices and/or other devices described herein. Data and/or instructions may include software applications and/or computer programs that may be used to perform the operations described herein (e.g., generating vehicle actuation commands) when executed by one or more processors in a computing device or other device. The data and/or instructions be written in source code that is compiled for execution by a computing device. The computer executable instructions may be stored on a computer readable medium (e.g., a non-transitory computer-readable medium) such as a hard disk, solid state drive, optical disk, removable storage media, solid state memory, and/or RAM. The functionality of the computing applications described herein may be combined or distributed in various embodiments. Further, the functionality of the computing applications described herein may be partly or wholly embodied in firmware or hardware equivalents including integrated circuits and/or field programmable gate arrays (FPGA).

Figure 2:
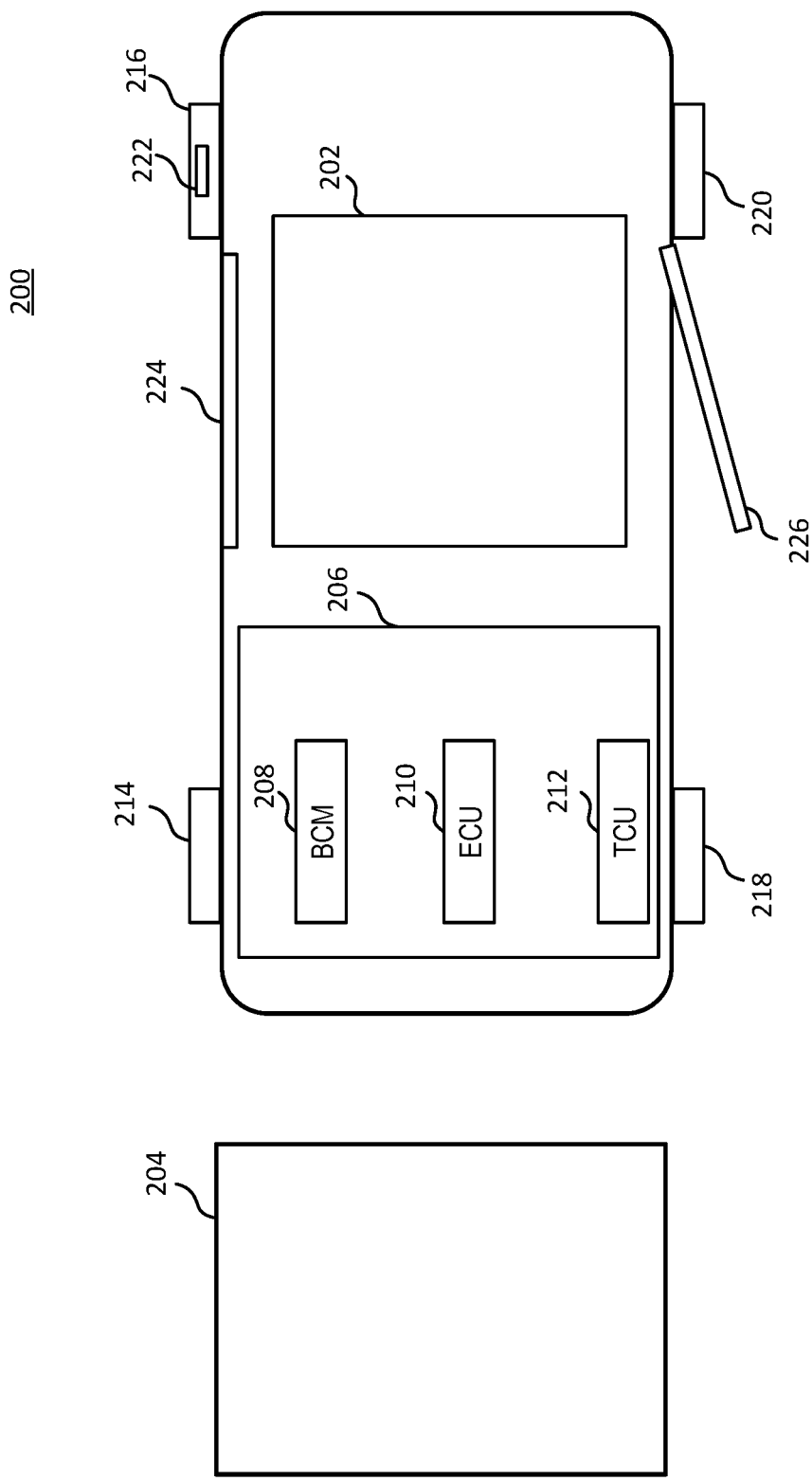
FIG. 2 shows an example of a vehicle in accordance with aspects of the present disclosure.

FIG. 2 illustrates one example of a vehicle in accordance with aspects of the present disclosure. For example, a vehicle 200 may implement one or more aspects of the present disclosure. Further, a vehicle 200 may include any of the features and/or capabilities of the computing system 104, a vehicle 106, and/or a vehicle 108 shown in FIG. 1. For example, a vehicle 200 may be a motor vehicle (e.g., a semi-truck) that includes various systems that may be remotely actuated based on a vehicle actuation command received by a vehicle 200. The operations performed by a vehicle 200 may be performed by the computing systems and/or computing devices that are described herein The vehicle 200 may include a cabin 202 (e.g., a cabin compartment) that may be used to accommodate one or more passengers and/or cargo. Further, the cabin 202 may include seating and/or vehicle control mechanisms (e.g., a steering wheel, accelerator pedal, brake pedal, climate control console, window controls, door controls, turn indicator controls, and/or an ignition control) that may be used to control various systems of a vehicle 200.

The cabin 202 and/or other portions of a vehicle 200 may be accessed via the door 224 and/or door 226. As shown in FIG. 2, the door 224 is in a closed and locked state which limits access to the cabin 202 via the door 224. Further, as shown in FIG. 2 the door 226 is in an opened and unlocked state which allows the cabin 202 to be accessed via the door 226. Further, the door 224 and/or the door 226 may comprise one or more windows that may be opened and/or closed. In this example, the door 226 has been unlocked and opened as the result of a vehicle actuation command that was received by the BCM 208, which caused the door 226 which had been locked to be unlocked and opened.

The vehicle 200, may include a vehicle computing system 206. The vehicle computing system 206 may include any of the features and/or components of the computing system 104, vehicle 106, and/or vehicle 108 that are shown in FIG. 1. For example, a vehicle computing system 206 may comprise one or more processors, one or more memory devices, a BCM, an ECU, and/or a TCU. The vehicle 200 is not limited to the configuration depicted in FIG. 2 and may include other systems and/or components which may be included as a combination of separate components and/or as parts of the same component.

BCM 208 may be used to actuate and/or control one or more systems (e.g., windows and/or climate control) of a vehicle 200 including systems associated with the cabin 202. For example, the BCM 208 may perform operations including locking windows, unlocking windows, locking doors, unlocking doors, and/or controlling a climate control system (e.g., a system used to regulate temperature and/or ventilation within the cabin 202. For example, the BCM 208 may send a signal to a door mechanism that causes the door mechanism to unlock the door 224.

The trailer 204 may comprise a trailer that may be used to carry passengers and/or cargo. The trailer 204 may be attached to and/or detached from a vehicle 200 and may be configured to receive signals (e.g., a vehicle actuation command) either directly or from the BCM 208 which may be used to actuate and/or control one or more devices associated with a vehicle 200 including the trailer 204. For example, the BCM 208 may control the locking and/or unlocking of a lock that is used to attach the trailer 204 to a vehicle 200.

One or more ECUs 210 may be used to actuate and/or control one or more systems (e.g., brakes, motor, and/or engine) of a vehicle 200. For example, the ECUs 210 may send a signal to a motor of a vehicle (e.g., an electric vehicle) that causes the motor to start up. In some embodiments, a single ECU may control a single system (e.g., an ECU that controls brakes a single brake) and/or type of system (e.g., an ECU that controls the brakes of a vehicle). In some embodiments, a single ECU may control multiple types of systems of a vehicle (e.g., an ECU that controls the brakes and engine of a vehicle). In some embodiments, multiple ECUs may be used to control a single system or type of system.

One or more of the ECUs 210 may perform operations including locking brakes, unlocking brakes, starting an engine of a vehicle, and/or shutting down the engine of a vehicle. For example, one or more of the ECUs 210 may lock the brake 222. Further, the ECU 210 may access a vehicle system and/or component to determine the state of that system and/or component. For example, the ECU 210 may determine the state (e.g., locked state or unlocked state) of the brake 222 and/or determine whether any of the wheels 214-220 are in motion or stationary, and if the wheels 214-220 are in motion, an estimated velocity of a vehicle 200 that is based on the rotations per minute of the wheels 214-220.

TCU 212 may be used for communication and/or to determine various states of a vehicle 200. For example, the may be configured to send and/or receive various types of signals (e.g., vehicle actuation commands that are transmitted wirelessly). For example, the TCU 212 may receive a vehicle actuation command that includes an instruction to unlock a door of a vehicle 200. The TCU 212 may send a vehicle actuation command to the BCM 208, which may then unlock the door 226. Further, the TCU 212 may be configured to determine the location (e.g., latitude, longitude, and/or altitude) and/or velocity of a vehicle 200. For example, the TCU 212 may determine that a vehicle is within a particular geographic location and that the velocity of a vehicle 200 is twenty kilometers per hour.

Aspects of the disclosure have been described in terms of embodiments shown herein. Various other embodiments, modifications, and variations are within the scope and spirit of the appended claims. For example, the steps shown in the figures may be performed in orders that are different from the order shown in the figures and/or one or more steps may be optional. Further one or more steps shown in the figures may be added and/or omitted in accordance with aspects of the disclosure.

Figure 3:
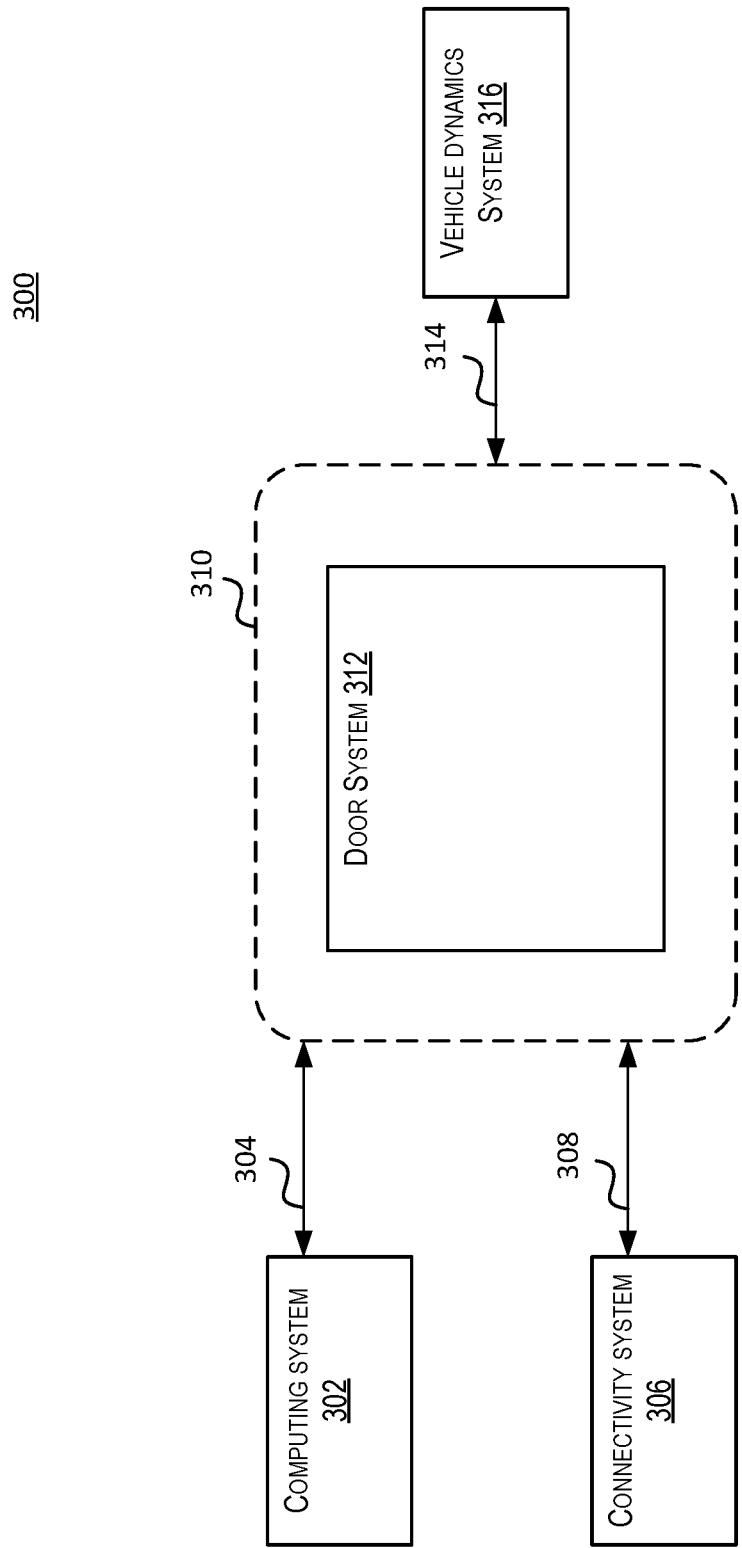
FIG. 3 shows an example of computing systems in accordance with aspects of the present disclosure.

FIG. 3 shows an example of computing systems in accordance with aspects of the present disclosure. In particular, FIG. 3 depicts a system 300 that is configured to perform operations associated with receiving signals and actuating a system of a vehicle based on the received signals. The operations performed by the system 300 may be performed by the computing systems and/or computing devices that are described herein.

The computing system 302 may comprise one or more computing devices that are configured to send and/or receive vehicle actuation commands. The computing system 302 may include any of the features and/or components of the computing system 104 shown in FIG. 1. As described herein, a vehicle actuation command may comprise one or more instructions that are used by a vehicle to actuate one or more systems of a vehicle. For example, a vehicle actuation command may comprise instructions to unlock a door associated with the door system 312. The computing system 302 may generate an interface that a user may use to generate a vehicle actuation command to remotely actuate various systems of a vehicle. In some embodiments, the computing system 302 may generate a graphical user interface from which a vehicle and system of a vehicle may be selected along with a type of action to be performed by the system.

For example, the computing system 302 may generate an interface that a user may use to generate a vehicle actuation command. After a vehicle actuation command is generated (e.g., a vehicle actuation command to unlock a door of a vehicle), the computing system 302 may communicate with other systems (e.g., the connectivity system 306) by sending signal 304 (e.g., a vehicle actuation command) and/or receiving signal 304 (e.g., a confirmation that a vehicle actuation command was used to actuate a vehicle system). Communications may be performed over the network 310 may be used for the transmission of signals to and/or from various systems associated with a vehicle including the computing system 302, the connectivity system 306, the door system 312, and/or a vehicle dynamics system 316. For example, the computing system 302 may generate a vehicle actuation command that is used to unlock doors of a vehicle. The vehicle actuation command may be sent as part of the signal 304 to connectivity system 306 via network 310.

The connectivity system 306 may receive and/or send, via the network 310, signal 308 which comprises a vehicle actuation command. For example, the connectivity system 306 may receive the signal 308 (e.g., a signal comprising instructions based on a vehicle actuation command in signal 304) from the computing system 302 via the network 310. In some embodiments, the connectivity system 306 may be part of a TCU (e.g., the TCU 212 shown in FIG. 2).

The vehicle dynamics system 316 may comprise a BCM that is configured to monitor the state of various components and/or systems (e.g., doors, windows, and/or cabin temperature control) of a vehicle associated with the door system 312. The vehicle dynamics system 316 may send and/or receive signal 314 which may include a signal sent to a vehicle associated with the door system 312 via network 310. In this example, a vehicle dynamics system 316 may send signal 314 to the door system 312. The signal 314 may include an indication of the state of a vehicle's interlocks and may be used by the door system 312 to determine whether the door system 312 may lock or unlock an associated door based on a vehicle actuation command.

For example, a vehicle dynamics system 316 may send a signal, via the network 310, to the door system 312. The signal may indicate the state of a vehicle's brakes (e.g., all of a vehicle's brakes are locked and a vehicle is not moving) which may be used to determine whether a door may be opened (e.g., the door system 312 may unlock a door if the brakes are locked and a vehicle is not moving). If a vehicle dynamics system 316 determines that a vehicle's brakes are not locked or that a vehicle is moving, the door system 312 may determine that a locked door of a vehicle may not be unlocked. Further, the door system 312 may be used to send an error status (e.g., an error code) associated with the door system 312 to the computing system. For example, if a vehicle actuation command has been determined to be invalid (e.g., invalid as the result of errors in a vehicle actuation command or a vehicle actuation command not being from an authorized entity), the door system may send an error status to the connectivity system 306, which may in turn send the error status to the computing system 302 for further processing (e.g., sending another vehicle actuation command to a vehicle).

Figure 4:
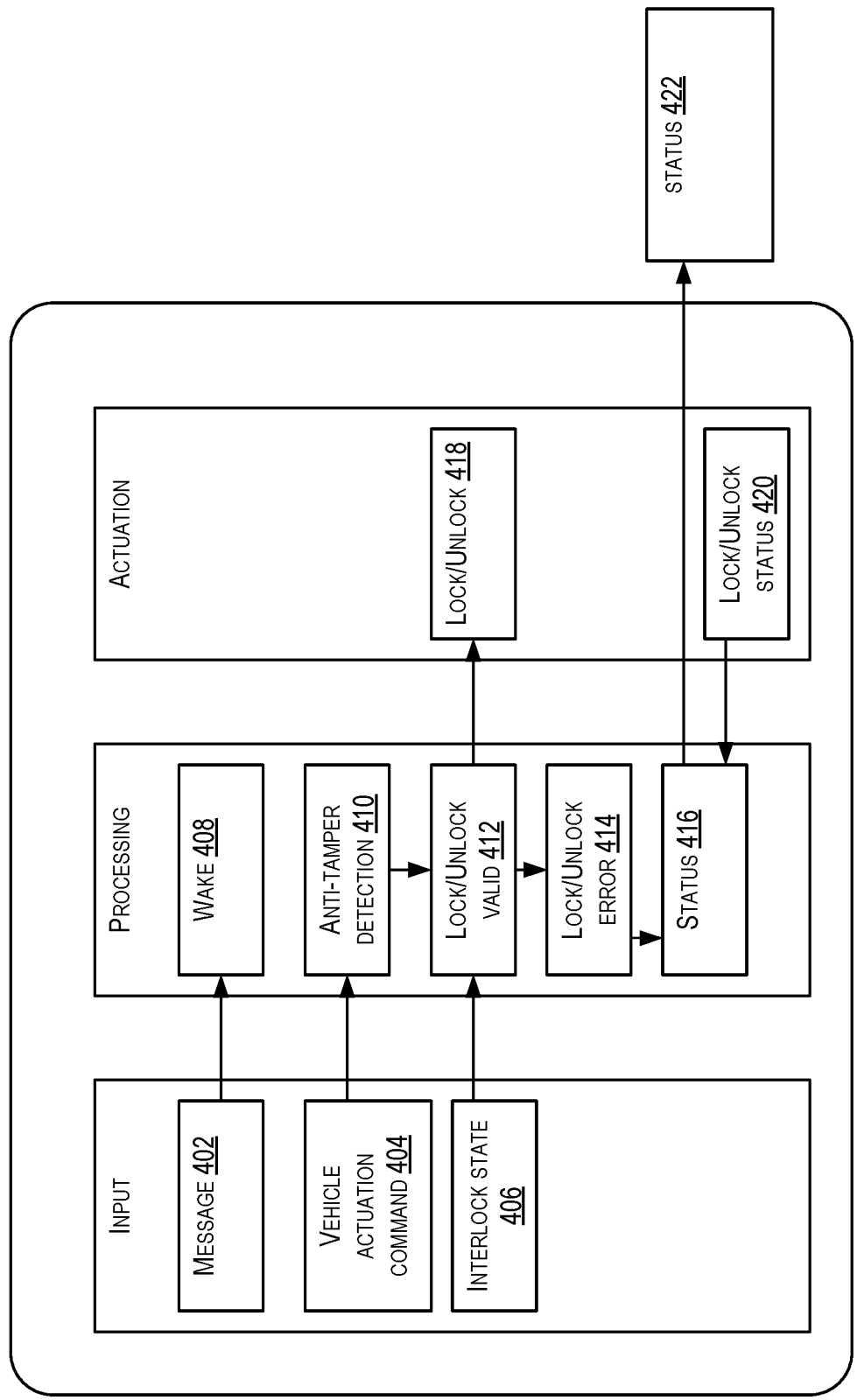
FIG. 4 shows an example of computing systems in accordance with aspects of the present disclosure.

FIG. 4 shows an example of computing systems in accordance with aspects of the present disclosure. In particular, FIG. 4 depicts a system 400 that is configured to perform operations associated with processing a vehicle actuation command. The operations performed by the system 400 may be performed by the computing systems and/or computing devices that are described herein.

The system 400 may comprise one or more computing devices that are configured to generate a vehicle actuation command that is used to actuate systems of a vehicle.

Further, the system 300 may include any of the features and/or components of the computing system 104 shown in FIG. 1 and/or the BCM 208, the ECU 210, and/or the TCU 212 shown in FIG. 2. The system 400 may perform one or more operations associated with actuating one or more systems of a vehicle. The operations performed by the system 400 may comprise receiving input, processing the input, actuating a vehicle's system, and/or outputting a status associated with actuation of a vehicle's system.

The system 400 may generate a message 402 (e.g., an SMS message or e-mail) may be sent to a vehicle (e.g., a TCU of a vehicle) and which may cause a vehicle and/or systems of a vehicle to become active (e.g., wake from a sleep or hibernation mode) based on performance of the wake operations 408 which include receiving the message 402, verifying that the message is from an entity that is authorized to actuate a vehicle system of a vehicle associated with the message, and wake systems of a vehicle if the message is from an authorized entity. If the message is not from an authorized entity or otherwise invalid, a vehicle systems will not be activated. After a vehicle system has been activated a vehicle actuation command 404 (e.g., a vehicle actuation command that includes instructions to unlock a door of a vehicle) is sent to a vehicle. The vehicle may perform one or more anti-tamper detection operations 410 to determine if a vehicle actuation command is valid (e.g., has not been compromised by an unauthorized entity and/or comprises the instructions and authorizations to actuate a vehicle system).

Based on a vehicle actuation command being determined to be valid, a signal based on the instruction indicated in a vehicle actuation command (e.g., an instruction to lock or unlock a door of a vehicle) may be sent to a BCM of a vehicle, which may then cause a vehicle system indicated in a vehicle actuation command to be actuated. Based on a vehicle system being successfully actuated, the status 420 may be determined by a BCM of a vehicle and status 416 may be generated and indicate that the door was successfully actuated and the state of the door (e.g., locked or unlocked). Further, the status 416 may be outputted as status 422 (e.g., a notification or message) based on a signal comprising the status 416 and indicating that a vehicle actuation command is valid and/or that a vehicle's system was successfully actuated may be sent to the computing device associated with an entity that is authorized to access and/or control a vehicle system indicated in a vehicle actuation command.

Based on a vehicle actuation command being determined to be invalid and/or a vehicle system not being successfully actuated, the status 420 may be determined by a BCM of a vehicle and status 416 may be generated and indicate that the door was not successfully actuated and the state of the door (e.g., locked or unlocked). Further, the status 416 may be outputted as status 422 (e.g., a notification or message) based on a signal comprising the status 416 and indicating that a vehicle actuation command is invalid may be sent to the computing device that sent to a computing device associated with an entity that is authorized to access and/or control a vehicle system indicated in a vehicle actuation command. Further, a signal comprising an error code that specifies a type of error that occurred and/or a potential reason a vehicle actuation command is invalid (e.g., a vehicle actuation command was corrupted in transit or is incomplete).

Figure 5:
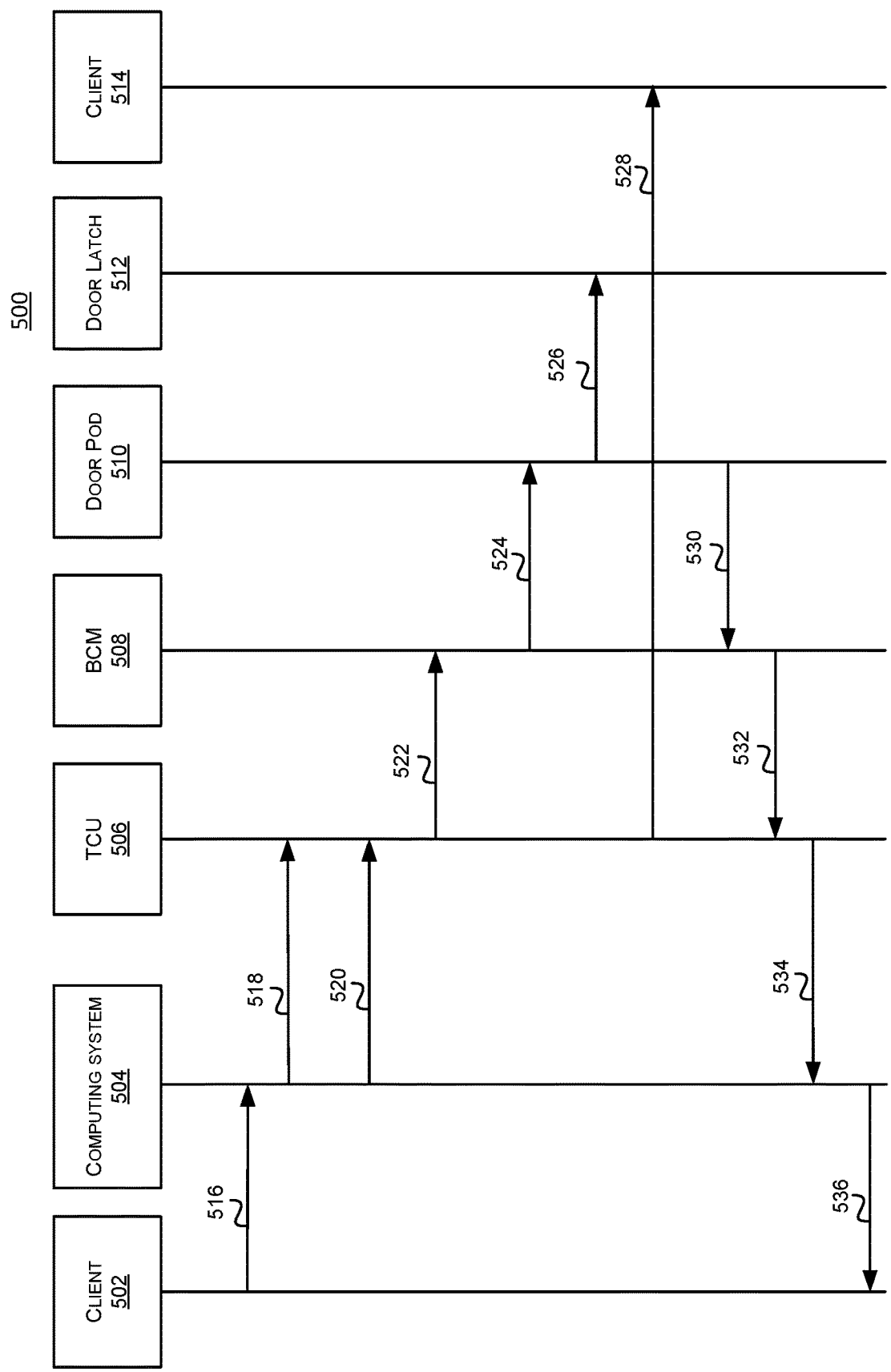
FIG. 5 shows a timing diagram that indicates a data flow of signals associated with a vehicle actuation command in accordance with aspects of the present disclosure.

FIG. 5 shows a timing diagram that indicates a data flow of signals associated with a vehicle actuation command in accordance with aspects of the present disclosure. Computing devices and/or systems associated with data flow 500 may include any of the features and/or components of the computing system 104 shown in FIG. 1 and/or the BCM 208, the ECU 210, and/or the TCU 212 shown in FIG. 2. Further, the operations performed as part of the data flow 500 may be performed by the computing systems and/or computing devices that are described herein.

The client computing device 502 (e.g., a smartphone configured to execute an application to request the actuation of a system of a vehicle) may send a signal 516 that includes a request to actuate a system of a vehicle associated with an entity that operates the client computing device 502. For example, an entity (e.g., a manager of a fleet of vehicles) may access a web portal that, upon verification of the entity's credentials (e.g., a user name and password), allows the entity to request that the doors of certain vehicles (e.g., vehicles specified in the request) be opened in preparation for the loading of cargo onto a vehicles. The client computing device 502 may generate the request and send signal 516 comprising the details of the request (e.g., vehicle identity and request to unlock doors) to the computing system 504.

The computing system 504 may be configured to receive the signal 516 and determine whether the request included in the signal 516 is valid and/or from an authorized entity. For example, the computing system 504 may analyze the request included in the signal 516 and determine whether the request is valid by determining whether the identity of the entity matches a list of entities authorized to access and/or control the system of a vehicle indicated in the request. By way of further example, the computing system 504 may perform error detection operations on the signal 516 to determine whether the signal 516 has errors (e.g., errors in the request that occurred during generation and/or transmission of the signal 516).

Further, the computing system 504 may be configured to receive requests from a variety of entities and may generate vehicle actuation commands to actuate systems of vehicles specified in the requests received from the entities. In this example, the computing system 504 may generate a vehicle actuation command that indicates the identity of the entity that generated the request included in the signal 516 as well as a vehicle system to be actuated (e.g., a door) and that a vehicle system is to be unlocked. The computing system 504 may send a wake message 518 to the TCU 506. The wake message may activate the TCU 506 so that the TCU 506 is active and ready to receive a vehicle actuation command from the computing system 504. In some embodiments, after receiving the wake message 518, the TCU 506 may send a confirmation signal to the computing system 504 to indicate that the TCU is ready to receive a vehicle actuation command.

The computing system 504 may send a signal 520 (e.g., a signal including a vehicle actuation command) to the TCU 506. The TCU 506 may in turn send a signal 522 (e.g., a signal including a vehicle actuation command) to the BCM 508. The BCM 508 may receive a vehicle actuation command and perform operations (e.g., checking interlocks associated with doors of a vehicle and performing a parity check on a vehicle actuation command) to determine whether a vehicle actuation command is valid and/or whether a vehicle is in a safe state that allows a vehicle actuation command to be implemented. Based on a vehicle actuation command being valid and a vehicle being in a safe state that allows a vehicle actuation command to be implemented, the BCM 508 may send signal 524 to the door pod 510. In some embodiments, the ECU (not shown) may perform operations including checking the validity of a vehicle actuation command and determining whether a vehicle is in a safe state (e.g., brakes of a vehicle are locked, and a vehicle is not moving) that allows a vehicle to implement a vehicle actuation command.

The door pod 510 (e.g., a door associated with a vehicle) may generate signal 526 based on receiving signal 524 from the BCM 508. In this example, the signal 524 comprise instructions to unlock the door latch 512. The door pod 510 may then generate the signal 526 to unlock the door latch 512 which results in the door latch 512 being unlocked. When the door latch 512 is unlocked, a vehicle associated with the door latch 512 may generate an indication that the door latch 512 was unlocked. For example, a vehicle associated with the door latch 512 may emit a series of beeping sounds or flash headlights and/or interior lights of a vehicle. After unlocking the door latch 512, the door pod 510 may send signal 530 to the BCM 508.

The signal 530 may comprise an indication that the door latch 512 was successfully unlocked. Based on determining that the door latch 512 was unlocked, the BCM 508 may send signal 528 to a client computing device 514 associated with an entity that may operate a vehicle associated with the door latch 512. For example, the BCM 508 may send signals including a notification (e.g., a text message) to a client computing device 514 that is operated by a driver of a vehicle. The notification included in the signal 528 may indicate that a vehicle has been unlocked and that the driver may enter a vehicle. Further, upon receiving the signal indicating that the door latch 512 was unlocked, the BCM 508 may send signal 532 to the TCU 506. Based on receiving the signal 532 from the BCM 508, the TCU 506 may send signal 534 to the computing system 504. The signal 534 may include a confirmation indicating that the door latch 512 was unlocked. The computing system 504 may then send signal 536 to the client computing device 502. The signal 536 may comprise a message to the operator of the client computing device 502 to indicate that the request included in the signal 516 was successfully completed.

Figure 6:
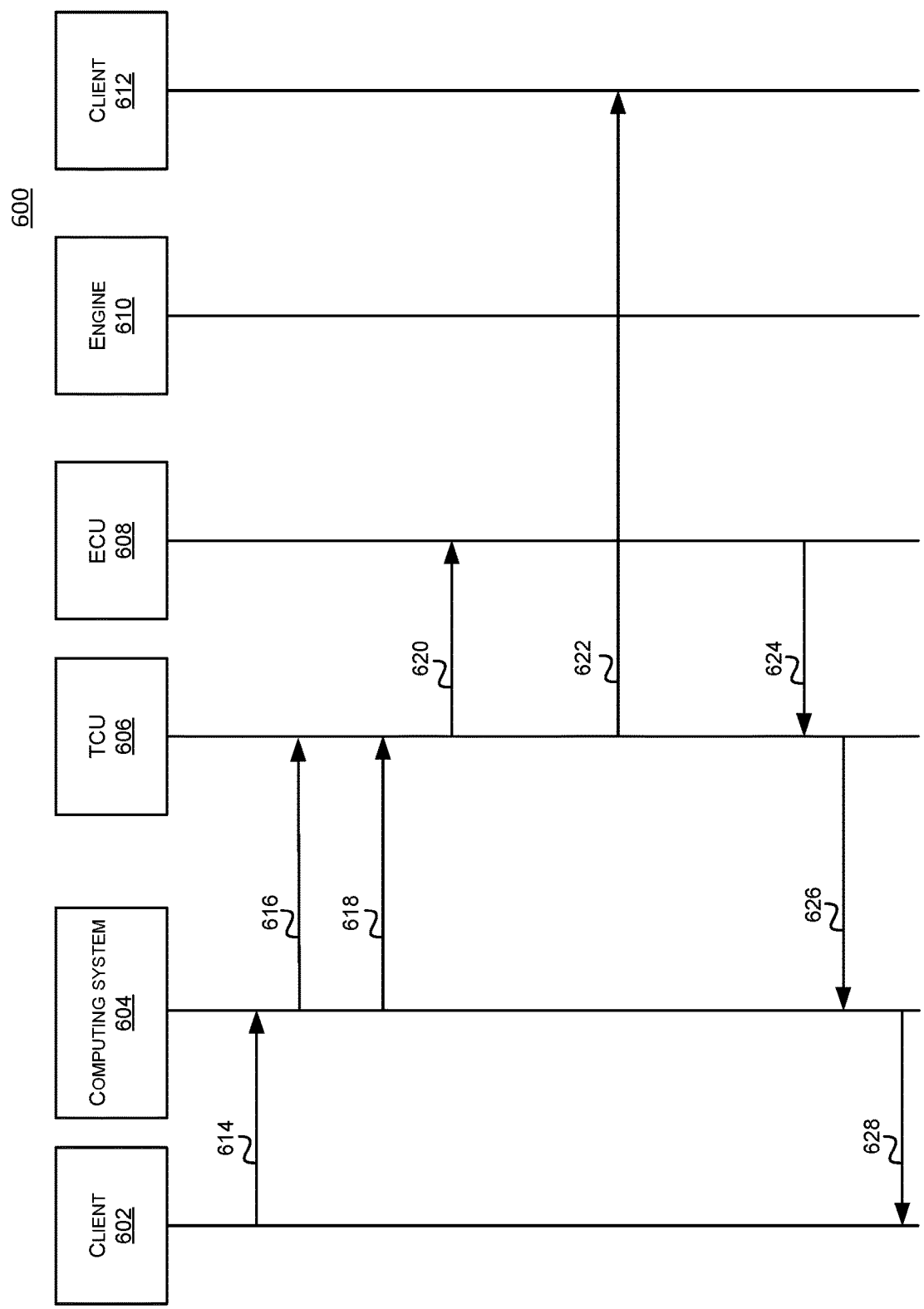
FIG. 6 shows a timing diagram that indicates a data flow of signals associated with a vehicle actuation command in accordance with aspects of the present disclosure.

FIG. 6 shows a timing diagram that indicates a data flow of signals associated with a vehicle actuation command in accordance with aspects of the present disclosure. Computing devices and/or systems associated with the data flow 600 may include any of the features and/or components of the computing system 104 shown in FIG. 1 and/or the BCM 208, the ECU 210, and/or the TCU 212 shown in FIG. 2. Further, the operations performed as part of the data flow 600 may be performed by the computing systems and/or computing devices that are described herein.

The client computing device 602, which may include features and/or components of the client computing device 502 shown in FIG. 5 may send a signal 614 that includes a request to actuate a system of a vehicle associated with an entity that operates the client computing device 602. For example, an entity (e.g., a logistics specialist in charge of preparing vehicles for use by drivers) may access a software application (e.g., a mobile application) that, upon verification of the entity's credentials (e.g., a user name and password), allows the entity to request that engine of a certain vehicle be turned on in order to warm the engine in a cold environment. The client computing device 602 may generate the request and send signal 614 comprising the details of the request (e.g., vehicle identity and request to turn on the engine of a vehicle) to the computing system 604.

The computing system 604 may be similarly configured to the computing system 504 shown in FIG. 5 and may receive the signal 614 and determine whether the request included in the signal 614 is valid and/or from an authorized entity. To determine the validity of the signal 614, the computing system 604 may perform operations similar to the operations performed by the computing system 504 show in FIG. 5. In this example, the computing system 604 may generate a vehicle actuation command that indicates the identity of the entity that generated the request included in the signal 614 as well as a vehicle system to be actuated (e.g., a door) and that a vehicle system is to be unlocked. The computing system 604 may send a wake message 616 to the TCU 606. The wake message 616 may cause the TCU 606 to be activated and ready to receive a vehicle actuation command from the computing system 604. In some embodiments, after receiving the wake message 616, the TCU 606 may send a confirmation signal to the computing system 604 to indicate that the TCU 606 is ready to receive a vehicle actuation command.

The computing system 604 may send a signal 618 (e.g., a signal including a vehicle actuation command) to the TCU 606. The TCU 606 may in turn send a signal 620 (e.g., a signal including a vehicle actuation command) to the ECU 608. The ECU 608 may comprise features and/or components of the TCU 212 shown in FIG. 2 and may receive a vehicle actuation command and perform operations (e.g., checking the state of the engine and performing error detection operations on a vehicle actuation command) to determine whether a vehicle actuation command is valid and/or whether a vehicle is in a safe state that allows a vehicle actuation command to be implemented. The ECU 608 may perform operations including checking the validity of a vehicle actuation command and determining whether a vehicle is in a safe state (e.g., brakes of a vehicle are locked, a vehicle is not moving, and/or the engine is not undergoing maintenance) that allows a vehicle to implement a vehicle actuation command. In this example, a vehicle associated with the engine 610 is undergoing maintenance (e.g., an oil change and change of spark plugs) and a vehicle is determined not to be in a safe state that allows a vehicle to implement a vehicle actuation command.

Based on the ECU 608 determining that the engine 610 may not be safely started up, the ECU 608 may generate signal 622 and send the signal 622 to a client computing device 612. The client computing device 612 may be associated with an entity that may operate a vehicle associated with the engine 610. For example, the ECU 608 may send signals including a notification (e.g., a text message) to a client computing device 612 that is operated by a driver of a vehicle. The notification included in the signal 622 may indicate that a vehicle is undergoing maintenance and that the engine 610 will not be started up in an unsafe state. Further, after sending the signal 622 including the indication that the engine 610 was not started up, the ECU 608 may send signal 624 to the TCU 606. Based on receiving the signal 624 from the ECU 608, the TCU 606 may send signal 626 to the computing system 604. The signal 626 may include a notification indicating that the engine 610 was not started up. The computing system 604 may then send signal 628 to the client computing device 602. The signal 628 may comprise a message to the operator of the client computing device 602 to indicate that the request included in the signal 614 was not successfully completed.

Figure 7:
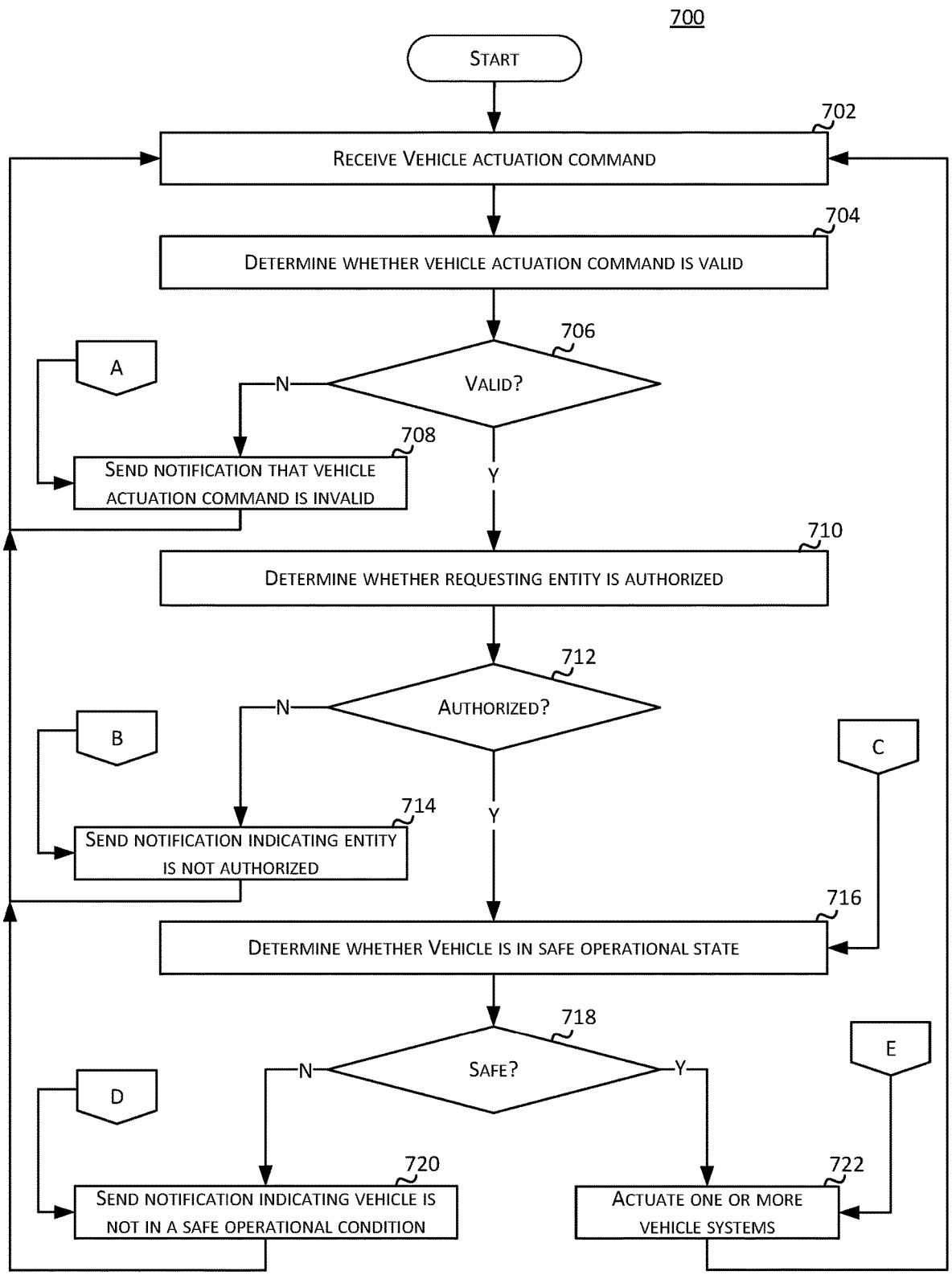
FIG. 7 shows a flowchart of an example method for processing a vehicle actuation command in accordance with aspects of the present disclosure.

FIG. 7 shows a flowchart of an example method for processing a vehicle actuation command in accordance with aspects of the present disclosure. Steps shown in FIG. 7 may be performed by any suitable computing device and/or combination of computing devices described herein (e.g., the computing system 104 and/or a vehicle 106). Further, the steps shown in FIG. 7 may be performed as part of a method 700. In some aspects, one or more steps of the method 700 may be omitted, performed in a different order, modified, and/or one or more additional steps may be added.

At 702, a vehicle actuation command may be received. For example, a vehicle actuation command may be received by the computing system 104 shown in FIG. 1 and/or the BCM 208 of the vehicle shown in FIG. 2. A vehicle actuation may comprise a request to actuate one or more systems of a vehicle. For example, a vehicle actuation command may comprise a request to lock or unlock a door of a vehicle, turn on a vehicle, and/or change the cabin temperature of a vehicle. Further, a vehicle actuation command may comprise one or more instructions that may be used by a vehicle system to perform some action indicated in a vehicle actuation command. For example, a vehicle actuation command may comprise an instruction to unlock a door or turn on an engine.

Further, a vehicle actuation command may comprise an indication of a requesting entity and/or one or more systems of a vehicle that a requesting entity is authorized to actuate. For example, a vehicle actuation command may comprise an indication that the name of an organization and/or individual associated with a vehicle actuation command and/or a listing of one or more vehicle systems (e.g., doors or engine) that the entity may be authorized to actuate.

The vehicle actuation command may comprise an indication of an authorized geographic area within which a vehicle actuation command may be authorized to actuate one or more systems of a vehicle. For example, the indication of the authorized geographic area may comprise a set of coordinates (e.g., latitude and longitude), a set of street addresses, parking lots, or buildings within which a vehicle actuation command may be received and/or implemented by a vehicle. Use of a vehicle actuation command is further described in the flow charts shown in FIGS. 8-10.

The vehicle actuation command may be received wirelessly. For example, a vehicle actuation command may be sent as part of a wireless signal (e.g., a cellular signal or wi-fi signal). Further, a vehicle actuation command may be received from a remote computing device associated with a requesting entity (e.g., the client computing device 502 shown in FIG. 5, and/or the client computing device 602 shown in FIG. 6).

A vehicle actuation command may comprise a message (e.g., an SMS message, a rich communication services message (RCS), or an e-mail). For example, a vehicle actuation command may be embedded in a SMS message.

A vehicle actuation command may comprise one or more instructions to: start up a vehicle, shut down a vehicle, lock one or more doors of a vehicle, unlock one or more doors of a vehicle, and/or set a cabin temperature of a vehicle. For example, a vehicle actuation command may comprise instructions to activate a climate control system of a vehicle and set the cabin temperature to twenty four degrees Celsius.

At 704, there may be a determination of whether a vehicle actuation command is valid. For example, the computing system 104 may analyze a vehicle actuation command and determine whether a vehicle actuation code includes any errors and/or is formatted in accordance with a predetermined standard. Further description of determining whether an actuation command is valid is included in the description of the flow chart shown in FIG. 8. Based on a determination that a vehicle actuation command is valid, an indicator of vehicle actuation command validity (e.g., a validity flag in vehicle actuation command validity data may be assigned a value of 1) may be generated. Based on a determination that a vehicle actuation command is invalid, an indicator of vehicle actuation command invalidity (e.g., a validity flag in vehicle actuation command validity data may be assigned a value of 0) may be generated.

At 706, based on a determination that a vehicle actuation command is valid, step 710 may be performed. For example, computing system 104 may access a vehicle actuation command flag in vehicle actuation command validity data, and based on a vehicle actuation command validity flag indicating that a vehicle actuation command is valid, step 710 may be performed.

Based on a determination that a vehicle actuation command is not valid, the system may perform step 708. For example, computing system 104 may access a vehicle actuation command flag in vehicle actuation command validity data, and based on a vehicle actuation command validity flag indicating that a vehicle actuation command is valid, step 708 may be performed.

At step 708, a notification may be sent. The notification indicate that a vehicle actuation command is not valid and may be sent to an entity (e.g., an organization and/or individual) with authorization to access or control a vehicle. For example, the computing system 104 may access entity data to determine an entity (e.g., a person or organization) that is authorized to access and/or control a system of a vehicle indicated in a vehicle actuation command. The computing system 104 may then generate a notification (e.g., a text message and/or e-mail) that indicates that a vehicle actuation command that was received is not valid and/or a date and/or time at which a vehicle actuation command was received. Following step 708, the method may 700 may end or the method 700 may return to step 702 and another vehicle actuation command may be received.

At step 710, there may be a determination of whether a requesting entity is authorized to actuate one or more systems of a vehicle. For example, the computing system 104 may compare a requesting entity indicated in a vehicle actuation command to a list of authorized entities associated with one or more systems of a vehicle indicated in a vehicle actuation command. Based on a requesting entity matching an authorized entity indicated in the list of authorized entities, there may be a determination that a requesting entity is authorized to actuate one or more systems of a vehicle. Based on a requesting entity not matching any of the authorized entities indicated in the list of authorized entities, there may be a determination that a requesting entity is not authorized to actuate one or more systems of a vehicle. Based on a determination that a requesting entity is authorized to actuate one or more systems of a vehicle, an indicator of entity authorization (e.g., an entity authorization flag in entity authorization data may be assigned a value of 1) may be generated. Based on a determination that a requesting entity is not authorized to actuate one or more systems of a vehicle, an indicator of entity authorization (e.g., an entity authorization flag in entity authorization data may be assigned a value of 0) may be generated.

At step 712, based on a determination that a requesting entity is authorized to actuate one or more systems of a vehicle indicated in a vehicle actuation command, the system may perform step 716. For example, computing system 104 may access an entity authorization flag in entity authorization data, and based on the entity authorization flag indicating that a requesting entity is authorized to actuate one or more systems of a vehicle indicated in a vehicle actuation command, step 716 may be performed.

Based on a determination that a requesting entity is not authorized to actuate one or more systems of a vehicle indicated in a vehicle actuation command, the system may perform step 714. For example, computing system 104 may access an entity authorization flag in entity authorization data, and based on the entity authorization flag indicating that a requesting entity is not authorized to actuate one or more systems of a vehicle indicated in a vehicle actuation command, step 714 may be performed.

At step 714, based on a requesting entity not being authorized to actuate one or more systems of a vehicle, a notification may be sent to an entity with authorization to access and/or control a vehicle. The notification may indicate that a vehicle actuation command from an entity that is not authorized to actuate one or more systems of a vehicle was received. For example, a vehicle 106 may send, to the computing system 104, a signal comprising a notification that an unauthorized entity attempted to unlock a door of a vehicle. Following step 714, the method may 700 may end or the method 700 may return to step 702 and another vehicle actuation command may be received.

At step 716, a system may determine whether a vehicle is in a safe operational state that will allow a vehicle actuation command to be safely implemented by one or more systems of a vehicle. Determining whether a vehicle is in a safe operational state may be performed by one or more systems of a vehicle including one or more ECUs of a vehicle, a BCM of a vehicle, and/or any system of a vehicle that may monitor the state of a vehicle, determine the location of a vehicle, and/or determine the state of one or more systems of a vehicle. For example, an ECU of a vehicle may be used to obtain the state of brakes of a vehicle and determine whether the brakes of a vehicle are locked. Further description of determining whether a vehicle is in a safe operational state is included in the description of the flow chart shown in FIG. 9.

Based on a determination that a vehicle is in a safe operational state, an indicator of operational safety (e.g., an operational safety flag in operational safety data may be assigned a value of 1) may be generated. Based on a determination that a vehicle is not in a safe operational state, an indicator of operational safety (e.g., an operational safety flag in operational safety data may be assigned a value of 0) may be generated.

At step 718, based on a determination that a vehicle is in a safe operational state, step 722 may be performed. For example, computing system 104 may access an operational safety flag in operational safety data, and based on the operational safety flag indicating that a vehicle is in a safe operational state, step 722 may be performed.

Based on a determination that a vehicle is not in a safe operational state, step 720 may be performed. For example, computing system 104 may access an operational safety flag in operational safety data, and based on the operational safety flag indicating that the that a vehicle is in a safe operational state, step 720 may be performed.

At step 720, a notification may be sent to a requesting entity. The notification may indicate that a vehicle is not in a safe operational state that will allow a vehicle actuation command to be safely implemented by one or more systems of a vehicle. For example, based on signals received from a vehicle, the computing system 104 may send a notification indicating that a vehicle is not in a safe operational state to a requesting entity. In some embodiments, the notification may indicate one or more conditions (e.g., brakes of a vehicle are not locked and/or a vehicle is not stationary) of a vehicle that prevented a vehicle from being in a safe operational state. Following step 720, the method may 700 may end or the method 700 may return to step 702 and another vehicle actuation command may be received.

At step 722, based on a determination that a vehicle is in a safe operational state, one or more systems of a vehicle may be actuated. For example, after a vehicle is determined to be in a safe operational state, an engine of a vehicle may be started up and one or more doors of a vehicle may be unlocked. Further, one or more systems of a vehicle may be actuated based on one or more systems of a vehicle that are indicated in a vehicle actuation command. For example, if a vehicle actuation command indicates that a door is to unlocked, then a door may be actuated. If a vehicle actuation command indicates that a cabin temperature is to be set to twenty degrees Celsius, then the temperature of the cabin may be actuated accordingly. Actuating one or more systems of a vehicle that are indicated in a vehicle actuation command may comprise starting up a vehicle, shutting down a vehicle, locking one or more doors of a vehicle, unlocking one or more doors of a vehicle, and/or setting a temperature of a vehicle's cabin based on the cabin temperature indicated in a vehicle actuation command.

Actuating one or more systems of a vehicle that are indicated in a vehicle actuation command may be based on one or more signals sent to one or more ECUs associated with one or more systems of a vehicle. For example, an ECU that controls the operation of a vehicle's engine may receive a signal indicating that the engine may be turned on. The ECU may then send a signal that causes the engine to be turned on. Following step 722, the method may 700 may end or the method 700 may return to step 702 and another vehicle actuation command may be received.

Figure 8:
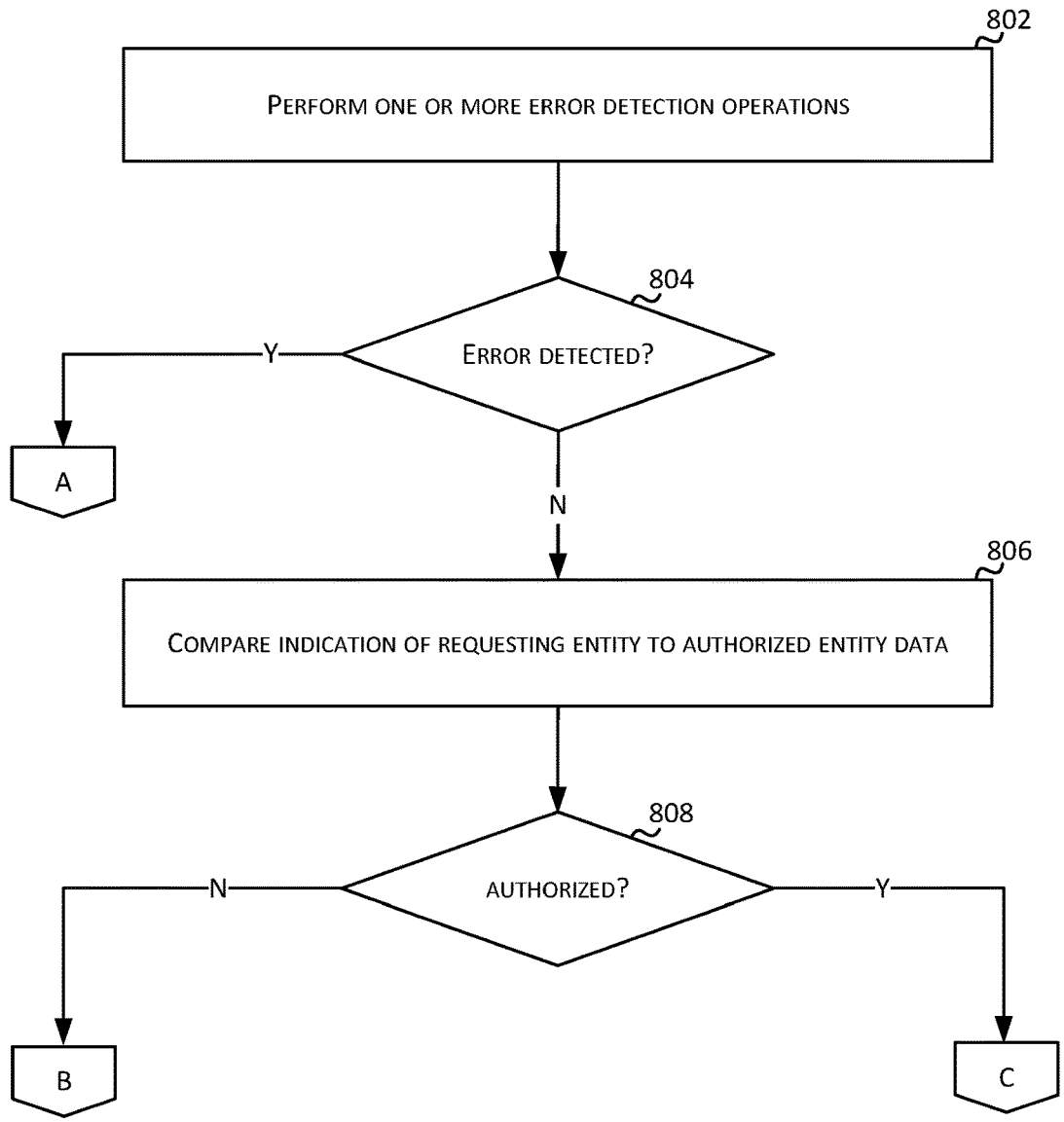
FIG. 8 shows a flowchart comprising steps for determining the validity of a vehicle actuation command in accordance with aspects of the present disclosure.

FIG. 8 shows a flowchart comprising steps for determining the validity of a vehicle actuation command in accordance with aspects of the present disclosure. Steps shown in FIG. 8 may be performed by any suitable computing device and/or combination of computing devices described herein (e.g., the computing system 104 and/or a vehicle 106). Further, one or more steps shown in FIG. 8 may be performed as part of the method 700 shown in FIG. 7. Further, one or more steps shown in FIG. 8 may be omitted, performed in a different order, or modified, and/or one or more additional steps may be added.

At step 802, one or more error detection operations may be performed to determine whether a vehicle actuation command is valid. For example, the computing system 104 may analyze a vehicle actuation command to determine that a vehicle actuation command does not include any errors. The one or more error detection operations may comprise a CRC, a checksum, and/or a parity check. After performing one or more error detection operations and based on not detecting an error in a vehicle actuation command, output comprising an indicator of vehicle actuation command validity (e.g., a validity flag may be assigned a value of 1) may be generated. Based on the detection of one or more errors in a vehicle actuation command, output comprising an indicator of vehicle actuation command invalidity (e.g., a validity flag may be assigned a value of 0) may be generated.

At step 804, based on the output of one or more error detection operations indicating that a vehicle actuation command is valid, step 810 may be performed. For example, computing system 104 may access a vehicle actuation command flag in vehicle actuation command validity data (e.g., a vehicle actuation command validity data described in step 704), and based on a vehicle actuation command validity flag indicating that a vehicle actuation command is valid, step 806 may be performed.

Based on the output of one or more error detection operations indicating that a vehicle actuation command is not valid, step 708 (e.g., sending a notification indicating that a vehicle actuation command is not valid) may be performed by way of the "A" connector shown in FIGS. 7 and 8. For example, computing system 104 may access a vehicle actuation command flag in vehicle actuation command validity data, and based on a vehicle actuation command validity flag indicating that a vehicle actuation command is valid, step 708 may be performed by way of the "A" connector shown in FIGS. 7 and 8.

At step 806, an indication of a requesting entity may be compared to authorized entity data comprising one or more indications of authorized entities that are authorized to actuate one or more systems of a vehicle indicated in a vehicle actuation command. Determining whether a requesting entity is authorized to actuate one or more systems of a vehicle may comprise wirelessly sending a vehicle actuation command from a TCU (e.g., the TCU 212 shown in FIG. 2) of a vehicle to a BCM of a vehicle (e.g., the BCM 208 shown in FIG. 2). The BCM and/or the TCU may be configured to determine whether a requesting entity is authorized to actuate one or more systems of a vehicle. For example, the BCM may store a list of authorized entities and perform operations to determine whether a requesting entity matches one of the entities indicated in the list of authorized entities that are authorized to actuate one or more systems of a vehicle indicated in a vehicle actuation command.

At step 808, based on an indication of a requesting entity matching at least one of one or more indications of authorized entities, there may be a determination that a vehicle actuation command is valid and step 716 (e.g., determining whether a vehicle is in a safe operational state) shown in FIG. 7 may be performed by way of the "C" connector shown in FIGS. 7 and 8

Based on the indication of a requesting entity not matching at least one of one or more indications of authorized entities, there may be a determination that a vehicle actuation command is not valid and step 714 (e.g., sending a notification indicating that a vehicle actuation command from an entity that is not authorized to actuate one or more systems of a vehicle was received) shown in FIG. 7 may be performed by way of the "B" connector shown in FIGS. 7 and 8.

Figure 9:
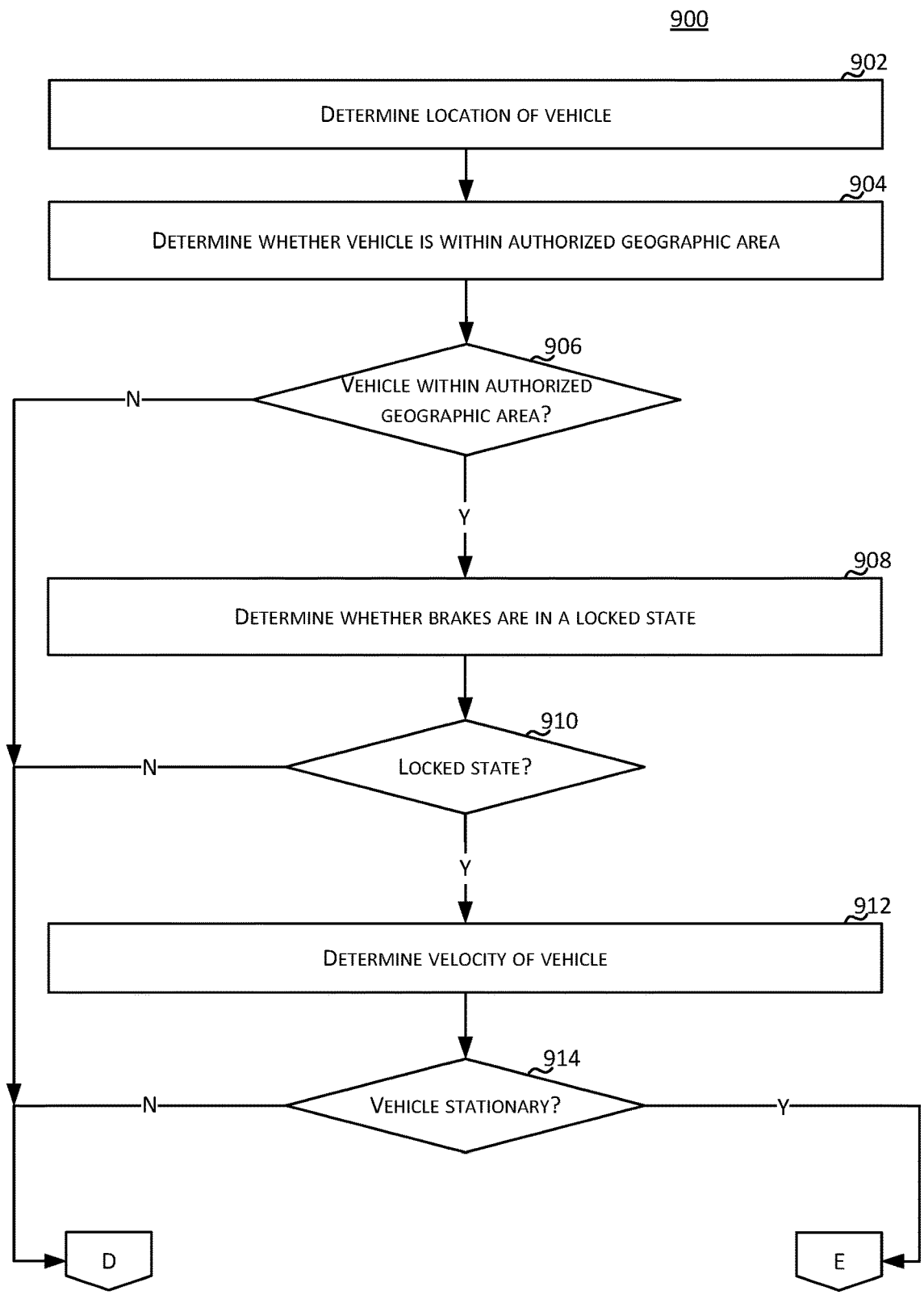
FIG. 9 shows a flowchart comprising steps for determining whether a vehicle is in a safe operational state in accordance with aspects of the present disclosure.

FIG. 9 shows a flowchart comprising steps for determining whether a vehicle is in a safe operational state in accordance with aspects of the present disclosure. Steps shown in FIG. 9 may be performed by any suitable computing device and/or combination of computing devices described herein (e.g., the computing system 104 and/or a vehicle 106). Further, one or more steps shown in FIG. 9 may be performed as part of the method 700 shown in FIG. 7. Further, one or more steps shown in FIG. 9 may be omitted, performed in a different order, or modified, and/or one or more additional steps may be added.

At step 902, a location of a vehicle may be determined. The location of a vehicle may be based on information from a navigation system of a vehicle. For example, the computing system 104 may access a TCU associated with a vehicle and receive signals comprising location data generated by a navigation system of the TCU to determine a location (e.g., latitude, longitude, and/or altitude) of a vehicle based on one or more signals (e.g., global positioning satellite (GPS) signals or global navigation satellite system (GLONAS) signals) the navigation system received from one or more satellites.

As described in step 702 of the method 700, a vehicle actuation command may comprise an indication of an authorized geographic area within which a vehicle actuation command is authorized to actuate one or more systems of a vehicle. At step 904, the system may determine whether a vehicle is within the authorized geographic area within which a vehicle actuation command is authorized to actuate one or more systems of a vehicle. For example, the location of a vehicle (e.g., the latitude, longitude, and/or altitude) of a vehicle may be compared to the indication of the authorized geographic area within which a vehicle actuation command is authorized to actuate one or more systems of a vehicle. In some embodiments, certain geographic areas may result in the location of a vehicle being determined not to be within an authorized geographic area. For example, if a vehicle is located in the middle of a road (e.g., a street or highway), a vehicle may be determined not to be in a safe operational state.

Based on the location of a vehicle being determined to be within the authorized geographic area, an indicator of operational safety (e.g., an operational safety flag in operational safety data may be assigned a value of 1) may be generated. Based on a determination that a vehicle is not within the authorized geographic area, an indicator of operational safety (e.g., an operational safety flag in operational safety data may be assigned a value of 0) may be generated.

At step 906, based on a vehicle being within the authorized geographic area, step 908 may be performed. For example, computing system 104 may access an operational safety flag in operational safety data, and based on the operational safety data indicating that a vehicle is within an authorized geographic location, step 908 may be performed.

Based on a vehicle not being within the authorized geographic area, step 720 (e.g., sending a notification indicating that a vehicle is not in a safe operational state) shown in FIG. 7 may be performed by way of the "D" connector shown in FIGS. 7 and 9.

At step 908, there may be a determination of whether one or more brakes of a vehicle are in a locked state. For example, the computing system 104 may access an ECU associated with a vehicle and receive signals comprising information associated with the state of a vehicle's brakes from an ECU. Based on a determination that a predetermined number of brakes are in a locked state (e.g., three out of four brakes are locked), an indicator of operational safety (e.g., an operational safety flag in operational safety data may be assigned a value of 1) may be generated. Based on a determination that a predetermined number of brakes are not in a locked state (e.g., two out of four brakes are not locked), an indicator of operational safety (e.g., an operational safety flag in operational safety data may be assigned a value of 0) may be generated.

At step 910, based on a predetermined portion of the brakes of a vehicle being in a locked state, step 912 may be performed. For example, computing system 104 may access an operational safety flag in operational safety data, and based on the operational safety data indicating that a predetermined portion of the brakes of a vehicle are in a locked state, step 912 may be performed. Based on a predetermined portion of the brakes of a vehicle not being in a locked state, step 720 (e.g., sending a notification indicating that a vehicle is not in a safe operational state) shown in FIG. 7 may be performed by way of the "D" connector shown in FIGS. 7 and 9.

At step 912, a velocity of a vehicle may be determined. For example, the computing system 104 may access a TCU associated with navigation and receive signals comprising information associated with the location and/or velocity of a vehicle from the TCU. Based on a determination that a vehicle is not moving (e.g., the velocity of a vehicle is zero), an indicator of operational safety (e.g., an operational safety flag in operational safety data may be assigned a value of 1) may be generated. Based on a determination that the velocity of a vehicle is greater than zero, an indicator of operational safety (e.g., an operational safety flag in operational safety data may be assigned a value of 0) may be generated.

At step 914, based on the velocity indicating that a vehicle is stationary, step 918 may be performed. For example, computing system 104 may access an operational safety flag in operational safety data, and based on the operational safety data indicating that a vehicle is stationary, step 912 may be performed. Based on velocity indicating that a vehicle is stationary, step 722 (e.g., actuating one or more systems of a vehicle) may be performed by way of the "E" connector shown in FIGS. 7 and 9. Based on velocity indicating that a vehicle is not stationary, step 720 (e.g., sending a notification indicating that a vehicle is not in a safe operational state) shown in FIG. 7 may be performed by way of the "D" connector shown in FIGS. 7 and 9.

Figure 10:
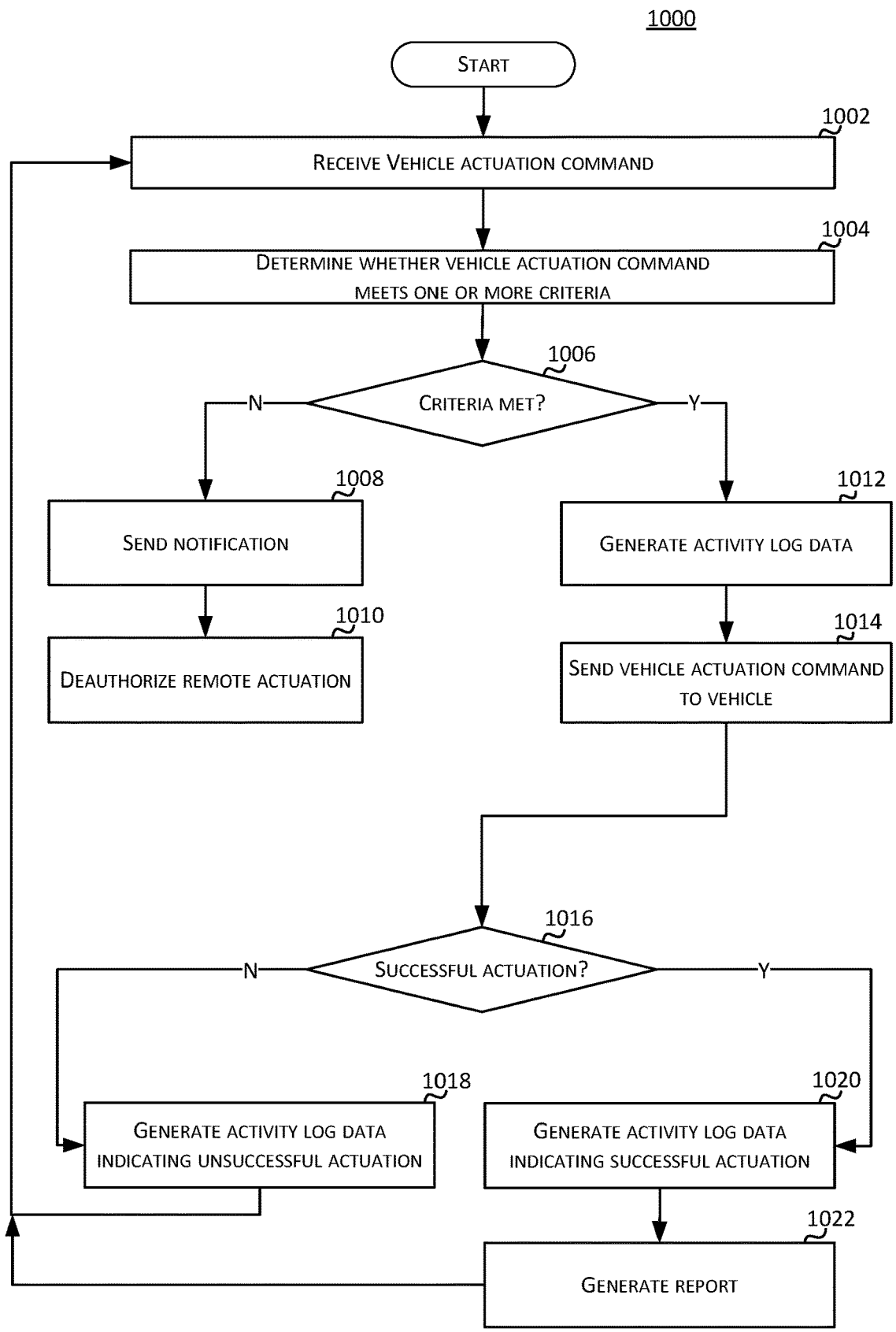
FIG. 10 shows a flowchart of an example method for processing a vehicle actuation command and generating activity log data in accordance with aspects of the present disclosure.

FIG. 10 shows a flowchart of an example method for processing a vehicle actuation command and generating activity log data in accordance with aspects of the present disclosure. Steps shown in FIG. 10 may be performed by any suitable computing device and/or combination of computing devices described herein (e.g., the computing system 104 and/or a vehicle 106). Further, steps shown in FIG. 10 may be performed as part of a method 1000, and one or more steps of the method 1000 may be performed as part of the method 700 shown in FIG. 7. One or more steps of the method 1000 may be omitted, performed in different orders, or modified, and/or one or more additional steps may be added.

At step 1002, a vehicle actuation command may be received. The vehicle actuation request and the operations associated with receiving a vehicle actuation command may be similar to vehicle actuation command and operations described in step 702 shown in FIG. 7. Further, a vehicle actuation command may comprise a request to actuate one or more systems of a vehicle. The vehicle actuation command may comprise an indication of a requesting entity, an indication of one or more systems of a vehicle that a requesting entity is authorized to actuate, a time stamp, and/or a location (e.g., latitude, longitude, and/or altitude) of a requesting entity.

The vehicle actuation command may comprise one or more scheduled actuation times at which to actuate one or more systems of a vehicle. Further, a vehicle actuation command may comprise one or more scheduled actuation times at which to deactivate one or more systems of a vehicle. The one or more actuation scheduled actuation times may comprise a time at which to actuate and/or deactivate one or more systems of a vehicle. For example, in extremely cold weather an engine may be actuated (e.g., started up) at a first time, left to run for a certain duration (e.g., fifteen minutes), then deactivated (e.g., shut down) at a second time indicated in a vehicle actuation command.

At step 1004, a system may determine whether a vehicle actuation command meets one or more criteria. As described in steps 706 and 712 shown in FIG. 7, and steps 804 and 808 shown in FIG. 8, one or more criteria may be associated with whether a vehicle actuation command is valid and/or whether a requesting entity is authorized to actuate one or more systems of a vehicle. Further, one or more criteria may comprise a threshold number of vehicle actuation commands that may be received within a predetermined time period and/or a location of a requesting entity matching at least one authorized entity location. For example, the computing system 104 may determine whether a vehicle actuation command meets one or more criteria based on determining a number of vehicle actuation commands that were received in the past hour and comparing the number of vehicle actuation commands that were received to a threshold amount of vehicle actuation commands. The one or more criteria may be met if the number of vehicle actuation commands received in the past hour exceeds the threshold number of vehicle actuation commands. The threshold number of vehicle actuation commands received within the predetermined time interval may be based on one or more time stamp associated with vehicle actuation commands that were received by the computing system 104.

By way of further example, the computing system 104 may determine whether a vehicle actuation command meets one or more criteria based on determining a location of a requesting entity and comparing the location of a vehicle to an authorized entity location (e.g., a known business address associated with an authorized entity). The one or more criteria may be met if the location of a requesting entity matches an authorized entity location. After determining whether a vehicle actuation command meets one or more criteria, the computing system 104 may generate an indication of whether a vehicle actuation command meets one or more criteria.

At step 1006, based on a vehicle actuation command meeting one or more criteria, step 1012 may be performed. For example, based on the indication of whether a vehicle actuation command meets one or more criteria indicating that one or more criteria were met, step 1012 may be performed.

Based on a vehicle actuation command not meeting one or more criteria, step 1008 may be performed. For example, based on the indication of whether a vehicle actuation command meets one or more criteria indicating that one or more criteria were not met, step 1020 may be performed.

At step 1008, based on a vehicle actuation command not meeting one or more criteria, a notification may be sent to an entity that is authorized to grant authorization to actuate one or more systems of a vehicle. The notification may comprise an indication of suspicious activity.

At step 1010, based on a vehicle actuation command not meeting one or more criteria, a vehicle actuation command comprising one or more instructions to deauthorize remote actuation of one or more systems of a vehicle may be sent to a vehicle. For example, the computing system 104 may access one or more instructions comprising an instruction to disable remote actuation of one or more systems of a vehicle until an instruction to reauthorize remote authorization of one or more systems of a vehicle has been received (e.g., received from an authorized entity) and/or a predetermined amount of time has elapsed (e.g., five minutes have elapsed). Following step 1018, the method may 1000 may end or the method 1000 may return to step 1002 and another vehicle actuation command may be received.

At step 1012, activity log data may be generated. Generation of the activity log data may be based on a vehicle actuation command and/or one or more indications of whether a vehicle actuation command meets one or more criteria. Generating activity log data may comprise generating one or more real-time indications associated with vehicle actuation commands received within a time window. For example, the activity log data may comprise one or more indications of rates at which vehicle actuation commands were received over the past day, week, month, and/or year. Further, the activity log data may comprise a total number of vehicle actuation commands received within the time window (e.g., a total number of vehicle actuation commands received in the past twenty-four hours), one or more time stamps indicating when vehicle actuation commands were sent, a location of a vehicle when a vehicle actuation command was received, and/or one or more locations from which each of the vehicle actuation commands was sent. The activity log data may be used as a data source from which patterns of suspicious activity, periods of low activity, and/or peak periods of activity may be determined.

At step 1014, based on a vehicle actuation command meeting one or more criteria, a vehicle actuation command may be sent to a vehicle (e.g., a vehicle indicated in a vehicle actuation command). For example, the computing system 104 may send a vehicle actuation command to a vehicle 106. In some embodiments a vehicle actuation command may be sent to a TCU of a vehicle.

In some embodiments, the vehicle or a system associated with the vehicle (e.g., a TCU) may be configured to send one or more error codes when a vehicle actuation command is received, and one or more systems of a vehicle are not successfully actuated. For example, the error code 414 indicated in the description of FIG. 4. Further, the vehicle or a system associated with the vehicle (e.g., a TCU) may be configured to send confirmation data comprising an indication that one or more systems of a vehicle were successfully actuated (e.g., the confirmation described in the signal 304 shown in FIG. 3, the signal 534 shown in FIG. 5, and/or the signal 626 shown in FIG. 6).

The one or more error codes may comprise an error code indicating that a vehicle actuation command was not valid and/or an error code indicating that a vehicle was not in a safe operational state at the time a vehicle actuation command was received. For example, an error code may indicate that a vehicle actuation code may have been tampered with and/or that a vehicle was in motion when a vehicle actuation command was sent.

At step 1016, there may be a determination of whether one or more systems of a vehicle indicated in a vehicle actuation command were successfully actuated. For example, based on the computing system 104 receiving confirmation data from a vehicle and/or there being an indication that a vehicle actuation command meets one or more criteria, step 1020 may be performed.

Based on a determination that one or more systems of a vehicle indicated in a vehicle actuation command were not successfully actuated, step 1018 may be performed.

At step 1018, based on determining that one or more systems of a vehicle were not successfully activated (e.g., one or more error codes were received from a vehicle), activity log data comprising an indication of one or more systems of a vehicle that were not successfully actuated may be generated. Following step 1018, the method may 1000 may end or the method 1000 may return to step 1002 and another vehicle actuation command may be received.

At step 1020, based on determining that one or more systems of a vehicle were successfully activated (e.g., receiving confirmation data from a vehicle), activity log data comprising an indication of one or more systems of a vehicle that were successfully actuated may be generated.

Further, at step 1022, a report based on the activity log data may be generated. The report may comprise one or more indications of a number of vehicle actuation commands that were successfully completed within a time window and/or a number of vehicle actuation commands that were not successfully completed within the time window. For example, the activity log data may comprise an indication that in the past day, twenty vehicle actuation commands resulted in successful actuation of a vehicle system and eight vehicle actuation commands did not result in successful actuation of a vehicle system. Following step 1022, the method may 1000 may end or the method 1000 may return to step 1002 and another vehicle actuation command may be received.

Although the subject matter of the present disclosure has been described in language specific to structural features and/or methodological acts, it is to be understood that the subject matter defined in the claims is not necessarily limited to the specific features or acts described herein. Rather, the specific features and operations described herein are disclosed as example implementations of the claims. The steps of any methods described herein are described as being performed in a particular order for the purposes of discussion. A person having ordinary skill in the art will understand that the steps of any methods described herein may be performed in any order and that any of the steps may be modified, omitted, combined, and/or expanded without departing from the scope of the present disclosure. Furthermore, the methods described herein may be performed using various types of systems, devices, apparatuses, and/or non-transitory computer-readable media.

What is claimed is:

1. A method comprising:
    receiving, by a computing device comprising one or more processors, a first vehicle actuation command comprising a first request to actuate one or more systems of a vehicle, wherein the first vehicle actuation command comprises a first indication of a first requesting entity and the one or more systems of the vehicle that the first requesting entity is authorized to actuate;
    determining whether the first vehicle actuation command is valid;
    based on a determination that the first vehicle actuation command is valid, determining whether the first requesting entity is authorized to actuate the one or more systems of the vehicle;
    based on a determination that the first requesting entity is authorized to actuate the one or more systems of the vehicle, determining whether the vehicle is in a safe operational state that will allow the first vehicle actuation command to be safely implemented by the one or more systems of the vehicle;
    based on a determination that the vehicle is in the safe operational state, actuating the one or more systems of the vehicle indicated in the first vehicle actuation command;
    receiving, by the computing device, a second vehicle actuation command comprising a second request to actuate the one or more systems of the vehicle, wherein the second vehicle actuation command comprises a second indication of a second requesting entity and the one or more systems of the vehicle that the second requesting entity is authorized to actuate;
    determining whether the second vehicle actuation command is valid; and
    based on a determination that the second vehicle actuation command is not valid, sending, to a third entity with authorization to access or control the vehicle, a notification indicating that the second vehicle actuation command is not valid,
    wherein the third entity is distinct from the second requesting entity.

2. The method of claim 1, wherein the determining whether the first vehicle actuation command is valid comprises:

performing one or more error detection operations to determine whether the first vehicle actuation command is valid, wherein the one or more error detection operations comprise a cyclic redundancy check (CRC), a checksum, or a parity check.

3. The method of claim 1, wherein the determining whether the first vehicle actuation command is valid comprises:
comparing the first indication of the first requesting entity to authorized entity data comprising one or more indications of authorized entities that are authorized to actuate the one or more systems of the vehicle indicated in the first vehicle actuation command; and
based on the first indication of the first requesting entity matching at least one of one or more indications of authorized entities, determining that the first vehicle actuation command is valid.

4. The method of claim 1, further comprising:
based on a determination that the vehicle is not in the safe operational state, sending to the first requesting entity, a notification indicating that the vehicle is not in the safe operational state that will allow the first vehicle actuation command to be safely implemented by the one or more systems of the vehicle.

5. The method of claim 1, wherein the first vehicle actuation command is received by a telematic control unit (TCU) of the vehicle, and wherein the determining whether the first requesting entity is authorized to actuate the one or more systems of the vehicle comprises:
wirelessly sending the first vehicle actuation command from the TCU of the vehicle to a body control module (BCM) of the vehicle, wherein the BCM is configured to determine whether the first requesting entity is authorized to actuate the one or more systems of the vehicle.

6. The method of claim 1, wherein the first vehicle actuation command comprises an second indication of an authorized geographic area within which the first vehicle actuation command is authorized to actuate the one or more systems of the vehicle, and wherein the determining whether the vehicle is in the safe operational state that will allow the first vehicle actuation command to be safely implemented by the one or more systems of the vehicle comprises:
determining a location of the vehicle;
determining whether the vehicle is within the authorized geographic area within which the first vehicle actuation command is authorized to actuate the one or more systems of the vehicle; and
based on a determination that the vehicle is within the authorized geographic area, determining that the vehicle is in the safe operational state that will allow the first vehicle actuation command to be safely implemented by the one or more systems of the vehicle.

7. The method of claim 6, wherein the location of the vehicle is based on information from a navigation system of the vehicle.

8. The method of claim 1, wherein the determining whether the vehicle is in the safe operational state that will allow the first vehicle actuation command to be safely implemented by the one or more systems of the vehicle comprises:
determining whether one or more brakes of the vehicle are in a locked state; and
based on a determination that a predetermined portion of the brakes of the vehicle are in the locked state, determining that the vehicle is in the safe operational state that will allow the first vehicle actuation command to be safely implemented by the one or more systems of the vehicle.

9. The method of claim 1, wherein the determining whether the vehicle is in the safe operational state that will allow the first vehicle actuation command to be safely implemented by the one or more systems of the vehicle comprises:
determining a velocity of the vehicle; and
based on the velocity of the vehicle indicating that the vehicle is stationary, determining that the vehicle is in the safe operational state that will allow the first vehicle actuation command to be safely implemented by the one or more systems of the vehicle.

10. The method of claim 1, wherein the determining whether the vehicle is in the safe operational state is performed by one or more electronic control units (ECUs) of the vehicle.

11. The method of claim 1, wherein the actuating the one or more systems of the vehicle that are indicated in the first vehicle actuation command is based on one or more signals sent to one or more electronic control units (ECUs) associated with the one or more systems of the vehicle.

12. The method of claim 1, wherein the first vehicle actuation command comprises instructions to start up the vehicle or instructions to shut down the vehicle, and wherein the actuating the one or more systems of the vehicle indicated in the first vehicle actuation command comprises:
based on the first vehicle actuation command comprising the instructions to start up the vehicle, starting up the vehicle; or
based on the first vehicle actuation command comprising the instructions to shut down the vehicle, shutting the vehicle down.

13. The method of claim 1, wherein the first vehicle actuation command comprises instructions to lock one or more doors of the vehicle or instructions to unlock one or more doors of the vehicle, and wherein the actuating the one or more systems of the vehicle indicated in the first vehicle actuation command comprises:
based on the first vehicle actuation command comprising the instructions to lock the one or more doors of the vehicle, locking the one or more doors of the vehicle; or
based on the first vehicle actuation command comprising the instructions to unlock the one or more doors of the vehicle, unlocking the one or more doors of the vehicle.

14. The method of claim 1, wherein the first vehicle actuation command comprises a request for a cabin temperature of the vehicle, and wherein the actuating the one or more systems of the vehicle that are indicated in the first vehicle actuation command comprises:
accessing a cabin control system of a vehicle cabin of the vehicle; and
setting a temperature of the vehicle cabin based on the cabin temperature indicated in the first vehicle actuation command.

15. The method of claim 1, further comprising:
based on the determination that the second requesting entity is not authorized to actuate the one or more systems of the vehicle, sending, to the third entity with authorization to access or control the vehicle, a notification indicating that the first vehicle actuation command was received from an entity that is not authorized to actuate the one or more systems of the vehicle.

16. The method of claim 1, wherein the first vehicle actuation command is received wirelessly, and wherein the first vehicle actuation command is received from a remote computing device associated with the first requesting entity.

17. The method of claim 1, wherein the first vehicle actuation command comprises a short message service (SMS) message.

18. One or more non-transitory computer readable media comprising instructions that, when executed by at least one processor, cause a computing device to perform operations comprising:
receiving a first vehicle actuation command comprising a request to actuate one or more systems of a vehicle, wherein the first vehicle actuation command comprises a first indication of a first requesting entity and the one or more systems of the vehicle that the first requesting entity is authorized to actuate;
determining whether the first vehicle actuation command is valid;
based on a determination that the first vehicle actuation command is valid, determining whether the first requesting entity is authorized to actuate the one or more systems of the vehicle;
based on a determination that the first requesting entity is authorized to actuate the one or more systems of the vehicle, determining whether the vehicle is in a safe operational state that will allow the first vehicle actuation command to be safely implemented by the one or more systems of the vehicle;
based on a determination that the vehicle is in the safe operational state, actuating the one or more systems of the vehicle indicated in the first vehicle actuation command;
receiving, by the computing device, a second vehicle actuation command comprising a second request to actuate the one or more systems of the vehicle, wherein the second vehicle actuation command comprises a second indication of a second requesting entity and the one or more systems of the vehicle that the second requesting entity is authorized to actuate;
determining whether the second vehicle actuation command is valid; and
based on a determination that the second vehicle actuation command is not valid, sending, to a third entity with authorization to access or control the vehicle, a notification indicating that the second vehicle actuation command is not valid,
wherein the third entity is distinct from the second requesting entity.

19. A computing device comprising:
one or more processors; and
memory storing instructions that, when executed by one or more processors, cause the computing device to:
receive a first vehicle actuation command comprising a request to actuate one or more systems of a vehicle, wherein the first vehicle actuation command comprises a first indication of a first requesting entity and the one or more systems of the vehicle that the first requesting entity is authorized to actuate;
determine whether the first vehicle actuation command is valid;
based on a determination that the first vehicle actuation command is valid, determine whether the first requesting entity is authorized to actuate the one or more systems of the vehicle;
based on a determination that the first requesting entity is authorized to actuate the one or more systems of the vehicle, determine whether the vehicle is in a safe operational state that will allow the first vehicle actuation command to be safely implemented by the one or more systems of the vehicle;
based on a determination that the vehicle is in the safe operational state, actuate the one or more systems of the vehicle indicated in the first vehicle actuation command;
receive, by the computing device, a second vehicle actuation command comprising a second request to actuate the one or more systems of the vehicle, wherein the second vehicle actuation command comprises a second indication of a second requesting entity and the one or more systems of the vehicle that the second requesting entity is authorized to actuate;
determine whether the second vehicle actuation command is valid; and
based on a determination that the second vehicle actuation command is not valid, send, to a third entity with authorization to access or control the vehicle, a notification indicating that the second vehicle actuation command is not valid,
wherein the third entity is distinct from the second requesting entity.

* * * * *